United States Patent
Yoshimoto et al.

(10) Patent No.: US 9,542,217 B2
(45) Date of Patent: Jan. 10, 2017

(54) SYSTEM, METHOD, AND RECORDING MEDIUM

(71) Applicant: FUJITSU LIMITED, Kawasaki-shi, Kanagawa (JP)

(72) Inventors: Yasuo Yoshimoto, Numazu (JP); Hiroki Sumida, Numazu (JP); Akira Kureha, Yokohama (JP); Yosuke Kondo, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 123 days.

(21) Appl. No.: 14/171,260

(22) Filed: Feb. 3, 2014

(65) Prior Publication Data

US 2014/0297842 A1 Oct. 2, 2014

(30) Foreign Application Priority Data

Mar. 26, 2013 (JP) .................. 2013-063349

(51) Int. Cl.
*G06F 15/173* (2006.01)
*G06F 9/455* (2006.01)
*G06F 11/34* (2006.01)
*G06F 3/06* (2006.01)
*G06F 1/32* (2006.01)
(Continued)

(52) U.S. Cl.
CPC ......... *G06F 9/45558* (2013.01); *G06F 1/3221* (2013.01); *G06F 1/3268* (2013.01); *G06F 3/067* (2013.01); *G06F 3/0625* (2013.01); *G06F 3/0634* (2013.01); *G06F 11/3003* (2013.01); *G06F 11/3055* (2013.01); *G06F 11/3062* (2013.01); *G06F 11/3409* (2013.01); *G06F 11/3452* (2013.01); *G06F 2009/4557* (2013.01); *G06F 2201/81* (2013.01); *G06F 2201/815* (2013.01); *G06F 2201/865* (2013.01); *H04L 43/10* (2013.01); *Y02B 60/1246* (2013.01)

(58) Field of Classification Search
USPC .................. 709/24, 203, 200, 220; 713/320
See application file for complete search history.

(56) References Cited

U.S. PATENT DOCUMENTS

2009/0187775 A1 7/2009 Ishikawa
2013/0040697 A1* 2/2013 Ekici .................. H04W 48/18
455/552.1
(Continued)

FOREIGN PATENT DOCUMENTS

JP 2009-169858 7/2009
JP 2011-204110 10/2011
(Continued)

OTHER PUBLICATIONS

Office Action issued Jul. 5, 2016, 2016 in Japanese Patent Application No. 2013-063349 (with Partial English language translation).

*Primary Examiner* — El Hadji Sall
(74) *Attorney, Agent, or Firm* — Oblon, McClelland, Maier & Neustadt, L.L.P.

(57) ABSTRACT

A system that compares first information corresponding to an amount of a first type of resource used when a first virtual machine is executed in an idle state with second information corresponding to an amount of the first type of resource used when a second virtual machine is executed, and determines whether the second virtual machine is in the idle state based on the comparison.

19 Claims, 30 Drawing Sheets

(51) Int. Cl.
*G06F 11/30* (2006.01)
*H04L 12/26* (2006.01)

(56) References Cited

U.S. PATENT DOCUMENTS

| | | | | |
|---|---|---|---|---|
| 2013/0047156 A1* | 2/2013 | Jian | ................ | G06F 9/5055 |
| | | | | 718/1 |
| 2013/0121089 A1* | 5/2013 | Shin | ................ | G11C 16/30 |
| | | | | 365/189.11 |
| 2014/0007091 A1* | 1/2014 | Arges | ................ | G06F 9/5011 |
| | | | | 718/1 |
| 2014/0181813 A1* | 6/2014 | Deshpande | ......... | G06F 9/45533 |
| | | | | 718/1 |

FOREIGN PATENT DOCUMENTS

| | | |
|---|---|---|
| JP | 2012-099148 | 5/2012 |
| JP | 2012-243096 A | 12/2012 |

* cited by examiner

FIG. 5

```
PowerLimit=556W
Server=host1, 262W, 16W
Server=host2, 262W, 16W
Server=host3, 262W, 16W
TimeRange=24H, 144H
LogDir=c:¥perf_dir
Idlestop=dynamic
VM=VM1,7
VM=VM2,3
VM=VM3,9
VM=VM4,1
VM=VM5,7
VM=VM6,5
VM=VM7,1
VM=VM8,3
VM=VM9,3
VM=VM10,5
```

FIG. 8

| HOST NAME | POWER CONSUMPTION MAXIMUM VALUE | STANDBY POWER | PROCESSOR FREQUENCY | NUMBER OF VIRTUAL CPUS | MEMORY AMOUNT | STATE |
|---|---|---|---|---|---|---|
| HOST 1 | 262W | 16W | 2.27GHz | 24 | 32GB | RUN |
| HOST 2 | 262W | 16W | 2.27GHz | 24 | 32GB | RUN |
| HOST 3 | 262W | 16W | 2.27GHz | 24 | 32GB | RUN |

FIG. 9

| VM NAME | HOST NAME | NUMBER OF ASSIGNED VIRTUAL CPUS | ASSIGNED MEMORY AMOUNT | TASK PRIORITY ORDER | STOP PRIORITY ORDER | IDLE TIME | IDLE TIME |
|---|---|---|---|---|---|---|---|
| VM1 | HOST 1 | 2 | 8GB | 7 | 1 | 9080 | 3 |
| VM2 | HOST 1 | 2 | 8GB | 3 | 1 | 7990 | 8 |
| VM3 | HOST 1 | 2 | 8GB | 9 | 7 | 11520 | 1 |
| VM4 | HOST 1 | 2 | 8GB | 1 | 1 | 10100 | 9 |
| VM5 | HOST 2 | 2 | 8GB | 7 | 3 | 10770 | 2 |
| VM6 | HOST 2 | 2 | 8GB | 5 | 1 | 5880 | 5 |
| VM7 | HOST 2 | 2 | 4GB | 1 | 1 | 9100 | 10 |
| VM8 | HOST 3 | 2 | 8GB | 3 | 1 | 10210 | 7 |
| VM9 | HOST 3 | 2 | 4GB | 3 | 1 | 11070 | 6 |
| VM10 | HOST 3 | 2 | 8GB | 5 | 7 | 11480 | 4 |

FIG. 10

| TIME AND DATE | VM NAME | CPU USAGE RATE | I/O DATA AMOUNT | DATA TRANSFER AMOUNT |
|---|---|---|---|---|
| ... | | | | |
| 2012/8/3 13:29 | VM1 | 20% | 10KB/s | 100KB/s |
| 2012/8/3 13:29 | VM2 | 30% | 300KB/s | 50KB/s |
| 2012/8/3 13:29 | VM3 | 0% | 5KB/s | 1KB/s |
| 2012/8/3 13:29 | IDLE01 | 4% | 20KB/s | 5KB/s |
| ... | | | | |
| 2012/8/3 13:30 | VM1 | 20% | 15KB/s | 100KB/s |
| 2012/8/3 13:30 | VM2 | 30% | 200KB/s | 30KB/s |
| 2012/8/3 13:30 | VM3 | 0% | 5KB/s | 1KB/s |
| 2012/8/3 13:30 | IDLE01 | 4% | 20KB/s | 5KB/s |
| ... | | | | |

FIG. 11

| | PAST (2012/7/27 13:31 TO 8/2 13:30) | | | | | LATEST (2012/8/2 13:31 TO 8/3 13:30) | | | | |
|---|---|---|---|---|---|---|---|---|---|---|
| | AVERAGE CPU USAGE RATE | AVERAGE I/O DATA AMOUNT | AVERAGE DATA TRANSFER AMOUNT | IDLE DETERMINATION | IDLE TIME | AVERAGE CPU USAGE RATE | AVERAGE I/O DATA AMOUNT | AVERAGE DATA TRANSFER AMOUNT | IDLE DETERMINATION | IDLE TIME |
| VM1 | 20% | 10KB | 100KB | RUN | 8000 MINUTES | 20% | 15KB | 100KB | RUN | 1080 MINUTES |
| VM2 | 30% | 300KB | 50KB | RUN | 7050 MINUTES | 30% | 200KB | 30KB | RUN | 940 MINUTES |
| VM3 | 0% | 5KB | 1KB | IDLE | 10080 MINUTES | 0% | 5KB | 1KB | IDLE | 1440 MINUTES |
| VM4 | 10% | 200KB | 50KB | RUN | 9050 MINUTES | 20% | 300KB | 50KB | RUN | 1050 MINUTES |
| VM5 | 2% | 10KB | 1KB | IDLE | 9870 MINUTES | 30% | 400KB | 20KB | RUN | 900 MINUTES |
| VM6 | 50% | 150KB | 40KB | RUN | 5030 MINUTES | 40% | 120KB | 40KB | RUN | 850 MINUTES |
| VM7 | 20% | 160KB | 100KB | RUN | 7900 MINUTES | 10% | 80KB | 110KB | RUN | 1200 MINUTES |
| VM8 | 10% | 40KB | 90KB | RUN | 9000 MINUTES | 10% | 30KB | 80KB | RUN | 1210 MINUTES |
| VM9 | 3% | 60KB | 20KB | RUN | 9770 MINUTES | 5% | 90KB | 20KB | RUN | 1300 MINUTES |
| VM10 | 0% | 20KB | 1KB | IDLE | 10080 MINUTES | 0% | 20KB | 1KB | IDLE | 1400 MINUTES |
| IDLE01 | 6% | 23KB | 7KB | | | 5% | 20KB | 5KB | | |
| ... | ... | ... | ... | ... | ... | ... | ... | ... | ... | ... |

FIG. 15

| PATTERN | PAST | LATEST | STOP PRIORITY ORDER | REMARKS |
|---|---|---|---|---|
| 1 | IDLE | IDLE | 1 | NO USE ALL THE TIME |
| 2 | RUN | IDLE | 3 | NO USE IN LATEST PERIOD |
| 3 | IDLE | RUN | 5 | POOR USAGE MANNER IN PAST PERIOD |
| 4 | RUN | RUN | 7 | USE ALL THE TIME |

FIG. 17

1) STOP VM1
2) STOP VM2
3) STOP VM4
4) STOP VM5
5) STOP VM6
6) STOP VM7
7) STOP VM8
8) STOP VM9
9) TURN OFF SERVER OF HOST 1
10) TURN OFF SERVER OF HOST 2
11) TURN OFF SERVER OF HOST 3

FIG. 18

1) STOP VM10
2) MOVE VM8 TO HOST 1
3) MOVE VM9 TO HOST 2
4) TURN OFF SERVER OF HOST 3

FIG. 19

```
1) STOP VM4
2) STOP VM5
3) STOP VM8
4) STOP VM9
5) MOVE VM6 TO HOST 1
6) MOVE VM7 TO HOST 1
7) TURN OFF SERVER OF HOST 3
8) TURN OFF SERVER OF HOST 2
```

US 9,542,217 B2

SYSTEM, METHOD, AND RECORDING MEDIUM

CROSS-REFERENCE TO RELATED APPLICATION

This application is based upon and claims the benefit of priority of the prior Japanese Patent Application No. 2013-063349, filed on Mar. 26, 2013, the entire contents of which are incorporated herein by reference.

FIELD

The embodiment discussed herein is related to a system, a method, and a recording medium.

BACKGROUND

In a cloud system which is built in a datacenter, a physical server executes processing, consuming power. Virtual machines which operate in a physical server do not execute processing all the time and some virtual machines do not execute processing (that is, some virtual machines are in the idle state). Even though virtual machines which operate in a physical server are in the idle state, the physical server consumes power. Therefore, it is favorable to stop virtual machines which are in the idle state to the extent possible from the viewpoint of energy saving.

However, in the cloud system, information related to virtual machines which is available to a manager is limited. Regarding a virtual machine, it is possible for a manager to know a central processing unit (CPU) load, a memory usage rate, an input/output (I/O) load or a data transfer amount in a network, and the like, for example, but it is difficult to know whether or not a virtual machine is in the idle state. This is because information of a virtual machine is information of a user of the virtual machine and therefore, it is a problem that information of a user is available to a manager.

The following technique is widespread regarding reduction of power consumption in a cloud system. Specifically, in a system in which a plurality of blade servers are arranged, power consumption of virtual machines which operate in the blade servers is measured and the virtual machines are aggregated (that is, put together into one group) so that the power consumption does not exceed the maximum power which is set in the blade servers. Then, a blade server in which a virtual machine is not activated due to the aggregation is stopped so as to reduce power consumption of the system.

However, in this technique, it is not assumed that a virtual machine in the idle state is specified. In this technique, even virtual machines which are in the idle state are aggregated in a blade server with virtual machines which are not in the idle state. Therefore, it is difficult to stop virtual machines which are in the idle state, thus limiting the reduction amount of power consumption.

Japanese Patent No. 4488072 (corresponding to Japanese Laid-open Patent Publication No. 2009-169858) is an example of related art.

SUMMARY

According to an aspect of the invention, a system compares first information corresponding to an amount of a first type of resource used when a first virtual machine is executed in an idle state with second information corresponding to an amount of the first type of resource used when a second virtual machine is executed, and determines whether the second virtual machine is in the idle state based on the comparison.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 illustrates an example of data which is stored in a control data storage unit;
FIG. 8 illustrates an example of server data;
FIG. 9 illustrates an example of VM data;
FIG. 10 illustrates an example of performance data;
FIG. 11 illustrates an example of tallied performance data;
FIG. 15 illustrates a rule in decision of stop priority;
FIG. 17 illustrates an example of data of a procedure;
FIG. 18 illustrates an example of data of a procedure;
FIG. 19 illustrates an example of data of a procedure.

DESCRIPTION OF EMBODIMENT

Figure 1:
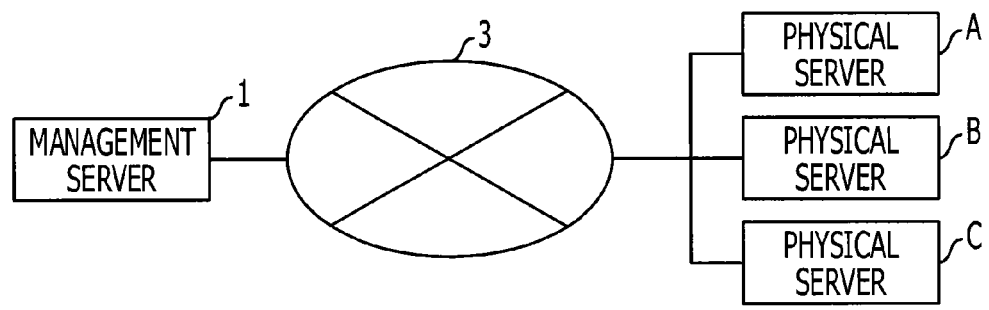
FIG. 1 schematically illustrates a system according to an embodiment.

FIG. 1 schematically illustrates a system according to an embodiment. A management server 1 which executes major processing in the embodiment is connected with physical servers A to C via a network 3 such as a local area network (LAN). The physical servers A to C are blade servers which are installed in a datacenter or the like, for example. Here, the number of physical servers is three in FIG. 1, but the number of physical servers is not limited.

Figure 2:
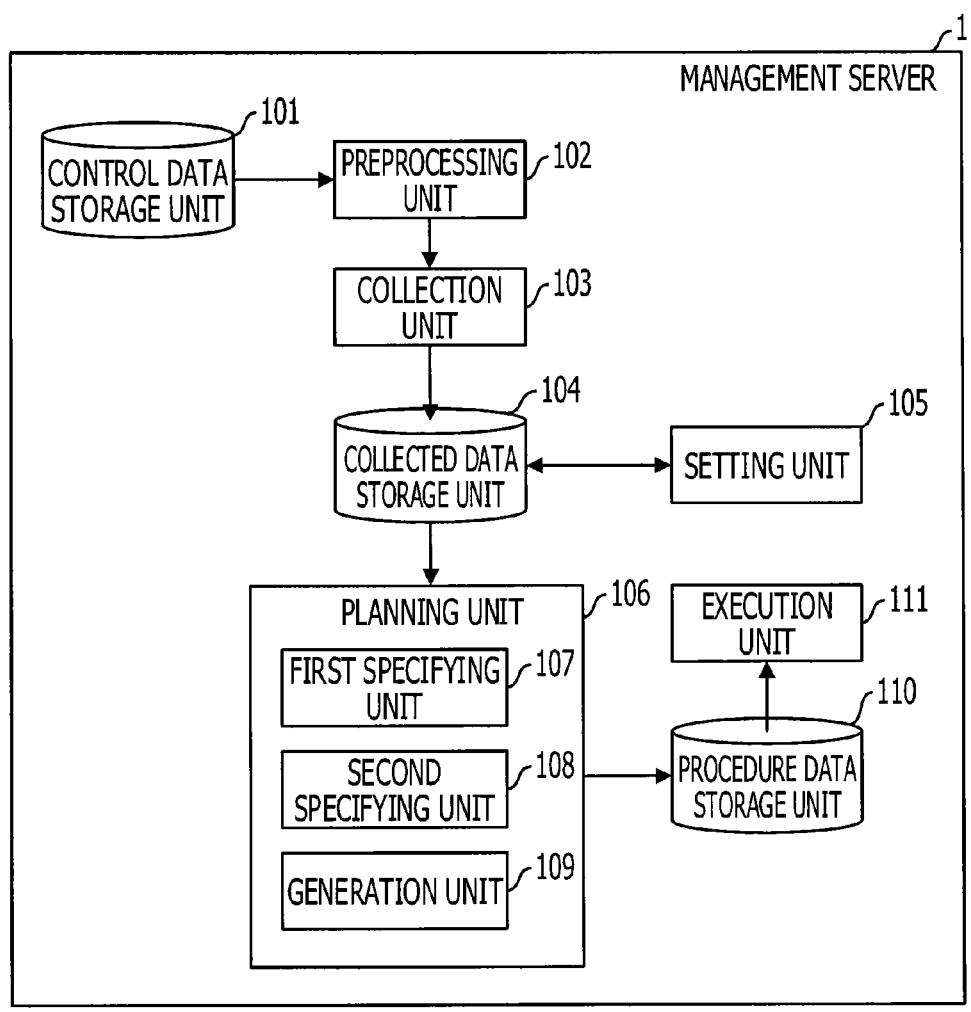
FIG. 2 is a functional block diagram of a management server.

FIG. 2 is a functional block diagram of the management server 1. In the example of FIG. 2, the management server 1 includes a control data storage unit 101, a preprocessing unit 102, a collection unit 103, a collected data storage unit 104, a setting unit 105, a planning unit 106 which includes a first specifying unit 107, a second specifying unit 108, and a generation unit 109, a procedure data storage unit 110, and an execution unit 111.

The preprocessing unit 102 performs processing by using data which is stored in the control data storage unit 101 and outputs a processing result to the collection unit 103. The collection unit 103 collects server data, VM data, and performance data and stores the server data, the VM data, and the performance data in the collected data storage unit 104. The setting unit 105 executes processing for obtaining a stop order of VMs, by using data which is stored in the collected data storage unit 104. The first specifying unit 107 executes processing for searching for a combination of servers of which power consumption is smaller than target power and outputs a processing result to the generation unit 109. The second specifying unit 108 executes processing for specifying a combination of arrangement of VMs and outputs a processing result to the generation unit 109. The generation unit 109 generates data of a procedure for reducing power consumption, by using data which is received from the first specifying unit 107 and data which is received from the second specifying unit 108 and stores the data of the procedure in the procedure data storage unit 110. The execution unit 111 executes processing for reducing power consumption, in accordance with data of a procedure which is stored in the procedure data storage unit 110. Here, software for automating works in the datacenter has been developed. Therefore, the execution unit 111 may be realized by using such software.

Figure 3:
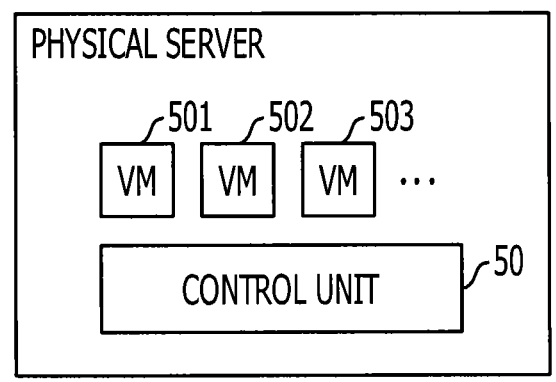
FIG. 3 is a functional block diagram of a physical server.

FIG. 3 is a functional block diagram of the physical servers A to C. In the example of FIG. 3, the physical servers A to C include a control unit 50 and virtual machines (VMs) 501 to 503 which execute task processing. The control unit 50 is a hypervisor which is control software for executing a VM and the VMs 501 to 503 are realized by the control unit 50. Here, the number of VMs is not limited.

Figure 4:
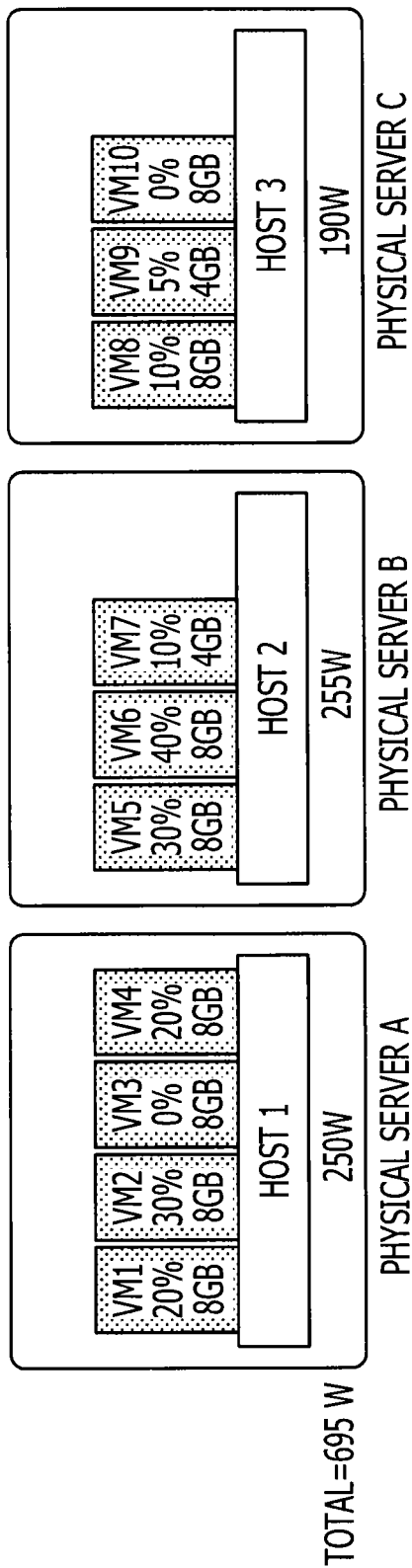
FIG. 4 illustrates an example of the configuration of the system.

For the sake of simplicity of the following description, it is considered that power consumption is reduced in a state depicted in FIG. 4. That is, VM1 to VM4 are realized on a host 1 of the physical server A, VM5 to VM7 are realized on a host 2 of the physical server B, and VM8 to VM10 are realized on a host 3 of the physical server C. The host is control software for executing a VM (may be the control unit 50). An operation system (OS) of each virtual system is included in each VM. It is assumed that an amount of a physical memory of each physical server is 32 gigabytes (GB). Numerical values depicted below VM names in FIG. 4 represent CPU usage rates and assigned memory amounts. Power consumption of the physical server A is 250 watts (W), power consumption of the physical server B is 255 W, and power consumption of the physical server C is 190 W, so that the total power consumption is 695 W.

FIG. 5 illustrates an example of data of a control statement which is stored in the control data storage unit 101. In the example of FIG. 5, data for designating target power (part of "PowerLimit= . . . "), data for designating a host name of a physical server, the maximum power consumption, and standby power (part of "Server= . . . "), data for designating the latest period and a past period (part of "TimeRange= . . . "), data for designating a folder in which performance data is stored (part of "LogDir= . . . "), data for designating whether or not a VM which is in the idle state (referred to below as an idle VM) is stopped immediately when the idle VM is detected (part of "Idlestop= . . . "), and data for designating a VM name and a task priority order (part of "VM= . . . ") are included.

The target power is 695×(1−0.2)=556 W when power consumption is cut by 20%, for example. The target power is 695×(1−0.5)=348 W when power consumption is cut by 50%, for example. The target power is 695×(1−0.8)=139 W when power consumption is cut by 80%, for example. The target power is 695×(1−1)=0 W, when power consumption is cut by 100%, for example.

A host name of a physical server and the like are designated for a physical server which is an object of power reduction. A host name and the like are not designated for a server such as management server, for example, which is not an object of reduction of power consumption. Data which is described in a catalogue, a specification, or the like may be used to designate standby power or standby power may be actually measured.

Figure 6:
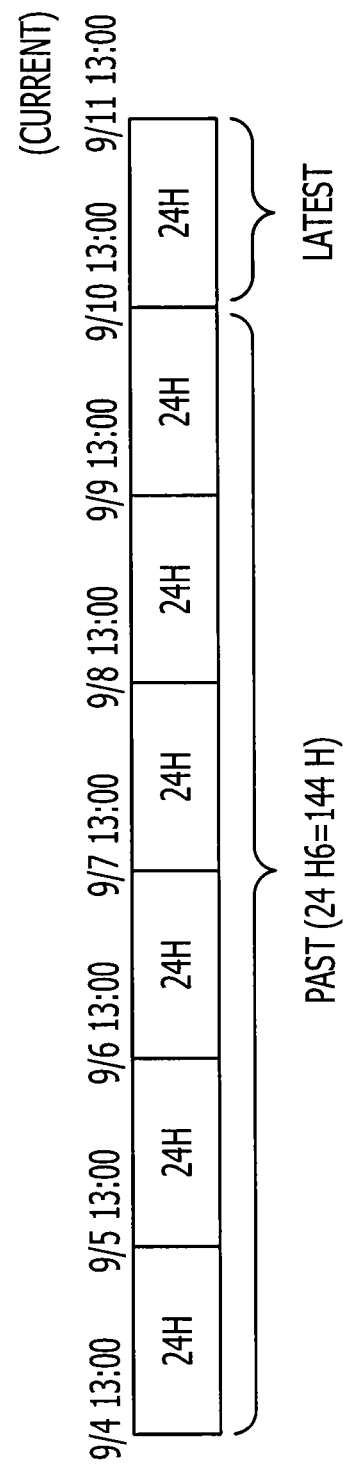
FIG. 6 illustrates latest and past periods.

The latest period is designated depending on a length of time from one time point in the past (September 10, 13:00 in the example of FIG. 6) to current time (September 11, 13:00 in the example of FIG. 6), as depicted in FIG. 6, for example. The past period is designated depending on a length of time from one time point in the past (September 4, 13:00 in the example of FIG. 6) to a start point of the latest period (September 10, 13:00 in the example of FIG. 6).

Performance data is data including a CPU usage rate, a memory usage amount, an I/O data amount of a disk device and the like, a data transfer amount in a network, and the like, and is stored in a designated folder.

In a case in which data of Idlestop=dynamic is included in data of the control statement, when an idle VM is detected, the VM is immediately stopped. In a case in which data of Idlestop=dynamic is not included, a VM is stopped when the VM is actually migrated.

The task priority order represents a priority order of task processing which is executed by a VM. When a value of the task priority order is 0, a VM is not stopped even if the VM is in the idle state. For example, in a case in which a VM user has a contract of non-stop operation with a manager, the task priority order is 0. When a value of the priority order is 1 or larger, a VM has a potential to be stopped if the VM is in the idle state.

An operation of the management server 1 is now described with reference to FIGS. 7 to 24. It is assumed that data of a control statement including designation by a manager is stored in the control data storage unit 101 of the management server 1. Further, it is assumed that the manger has instructed the management server 1 to start an operation of a power consumption reduction mode.

Figure 7:
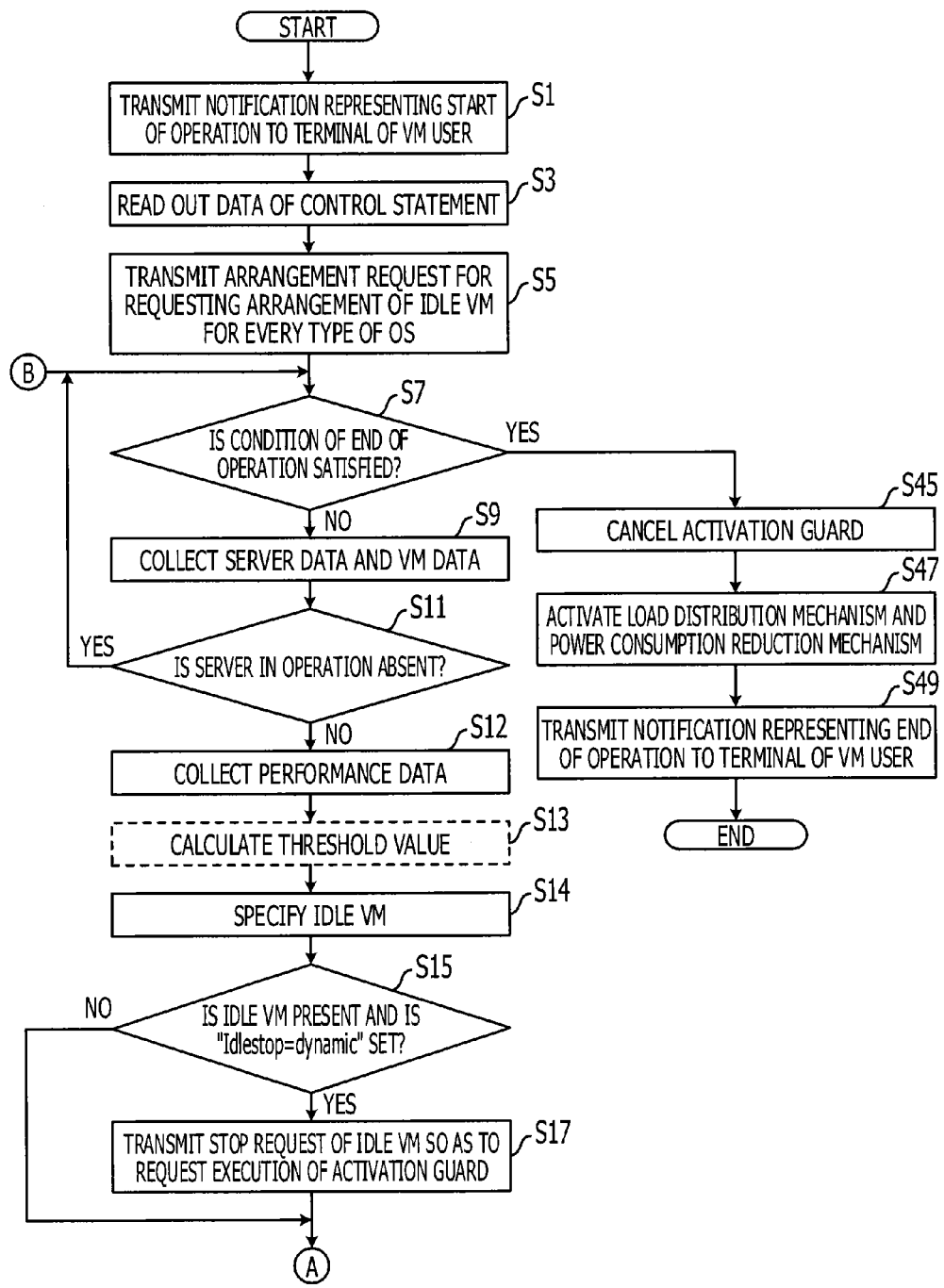
FIG. 7 illustrates a main processing flow.

When the preprocessing unit 102 of the management server 1 receives an instruction of the start of the operation, the preprocessing unit 102 issues notification representing the start of the operation to a terminal of a VM user, by a mail, for example (FIG. 7: step S1).

The preprocessing unit 102 reads out the data of the control statement from the control data storage unit 101 (step S3).

The preprocessing unit 102 transmits an arrangement request for requesting arrangement of an idle VM for every type of OSs (for example, Windows®, Linux®, or the like) to a physical server which is designated in the data of the control statement (step S5). Here, a plurality of types of guest OSs which are OSs of VMs may exist in a physical server. In such a case, an idle VM is arranged for every type of OSs in the physical server. For example, in a case in which OSs of VMs which are executed in a physical server depicted in FIG. 3 are an OS#1 and an OS#2, an idle VM of which an OS is the OS#1 and an idle VM of which an OS is the OS#2 are arranged.

Here, in a case in which a plurality of physical servers having the same attributions (for example, a model of a physical server, an OS installed on the physical server, a connection environment, or the like) are arranged, arrangement of idle VMs for respective physical servers causes waste of resources. In such a case, an idle VM may be arranged for any one physical server among a plurality of physical servers. However, there is a possibility that a plurality of physical servers have different attributions while the operation is continued, so that it is favorable to regularly arrange and check idle VMs.

The preprocessing unit 102 determines whether or not a condition of an end of the operation is satisfied (step S7). The condition of an end of the operation is a condition in which the current time becomes the time of an end of the operation, for example.

When the condition of the end of the operation is not satisfied (step S7: No route), the preprocessing unit 102 issues a processing execution request, which includes the data of the control statement, to the collection unit 103. In response to this request, the collection unit 103 collects server data and VM data from the physical servers A to C and stores the server data and the VM data in the collected data storage unit 104 (step S9). Here, the collection unit 103 stores the server data in a server table in the collected data storage unit 104 and stores the VM data in a VM table in the collected data storage unit 104.

FIG. 8 illustrates an example of server data. In the example of FIG. 8, a host name, the maximum value of power consumption, standby power, a processor frequency, the number of virtual CPUs, a memory amount, and data representing a state are included. The collection unit 103 acquires a host name, the maximum value of power consumption, and standby power from a data storage unit (not depicted) managed by the management server 1 or a physical server. Further, the collection unit 103 acquires a processor frequency, the number of virtual CPUs, and a memory amount from server management software which is installed on a physical server, for example. Data representing a state is "run" when a physical server is in operation and is "stop" when the physical server is not in operation. Data representing a state is available by using a technique of alive monitoring. The technique of alive monitoring is widespread, so that detailed description of the technique is omitted here.

FIG. 9 illustrates an example of VM data. In the example of FIG. 9, a VM name, a host name, the number of assigned virtual CPUs, an assigned memory amount, a task priority order, a stop priority order, idle time, and a stop order are included. A task priority order, a stop priority order, idle time, and stop time are not set on the time point of step S9 but are set in the following processing. A VM name, a host name, the number of assigned virtual CPUs, and an assigned memory mount are acquired from the control unit 50 of a physical server.

The collection unit 103 scans data representing a state in the server table so as to determine whether or not a server in operation is present (step S11). When a server in operation is not present (step S11: Yes route), power consumption may not be reduced and therefore, the processing returns to the processing of step S7. Then, at the next predetermined time, the processing of step S7 is executed. Accordingly, it is possible to regularly perform processing.

On the other hand, when a server in operation is present (step S11: No route), the collection unit 103 collects performance data and stores the performance data in the collected data storage unit 104 (step S12).

FIG. 10 illustrates an example of performance data. In the example of FIG. 10, time and date, a VM name, a CPU usage rate, an I/O data amount, and a data transfer amount in a network are included. The collection unit 103 regularly accesses a folder which is designated by LogDir in the data of the control statement so as to collect performance data.

Here, the collection unit 103 tallies collected performance data for the latest and past periods. FIG. 11 illustrates an example of tallied performance data. In the example of FIG. 11, an average CPU usage rate, an average I/O data amount, an average data transfer amount, data representing whether or not a VM is in the idle state, and idle time during the period are included for the latest and past periods. "Run" represents that a VM is not in the idle state, and "Idle" represents that a VM is in the idle state. Here, on the time point of the processing of step S12, data representing whether or not a VM is in the idle state and idle time are not stored.

The collection unit 103 calculates a threshold value on the basis of performance data which is tallied for idle VMs which are arranged through the processing of step S5 (step S13) and stores the threshold value in a storage device such as a main memory. A threshold value is obtained by directly using a numerical value related to performance of an idle VM in the latest period or multiplying the numerical value by a predetermined rate, for example. Here, it is sufficient to execute the processing of step S13 once and the processing of step S13 does not have to be executed on and after the second time, so that the processing of step S13 is depicted in a dashed-lined block.

The collection unit 103 compares a numerical value related to performance of a VM with a threshold value calculated in step S13 so as to specify a VM which is in the idle state at the current point (step S14). In this embodiment, it is assumed that a VM of which all of the CPU usage rate, the I/O data amount, and the data transfer amount in a network are equal to or smaller than a threshold value is determined as an idle VM.

The collection unit 103 determines whether or not a VM which is in the idle state is present at the current point and whether or not "Idlestop=dynamic" is set (step S15). When a VM in the idle state is not present at the current point or "Idlestop=dynamic" is not set (step S15: No route), the processing shifts to S19 of FIG. 14 via the terminal A.

On the other hand, when a VM in the idle state is present at the current point and "Idlestop=dynamic" is set (step S15: Yes route), the collection unit 103 transmits a stop request of the idle VM to a physical server which executes the VM. Further, the collection unit 103 issues an activation guard request for requesting execution of activation guard for the VM to the physical server (step S17). In response to the request, the control unit 50 in the physical server executes the activation guard. The activation guard represents that control is executed so that a specific VM is not executed. Then, the processing shifts to S19 of FIG. 14 via the terminal A.

Figure 14:
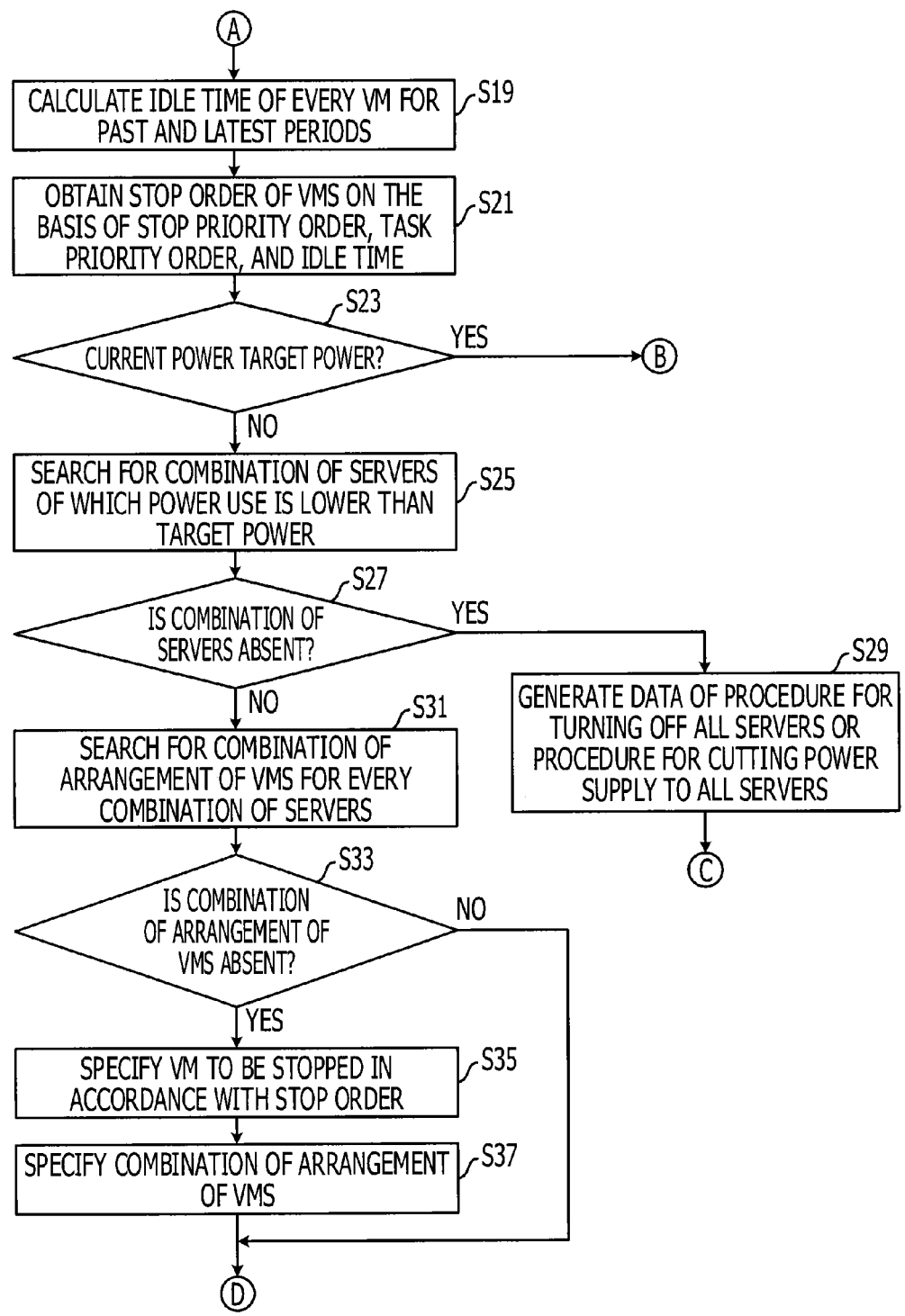
FIG. 14 illustrates a main processing flow.

Shifting to the description of FIG. 14, the collection unit 103 calculates idle time for every VM for the past and latest periods and stores the idle time and data representing whether or not the VM is in the idle state in the table depicted in FIG. 11 (step S19). For example, when a percentage of the idle time is 90% or more in the latest period, it is determined that the VM is in the idle state in the latest period. When a percentage of the idle time is 90% or more in the past period, it is determined that the VM is in the idle state in the past period.

Figure 12:
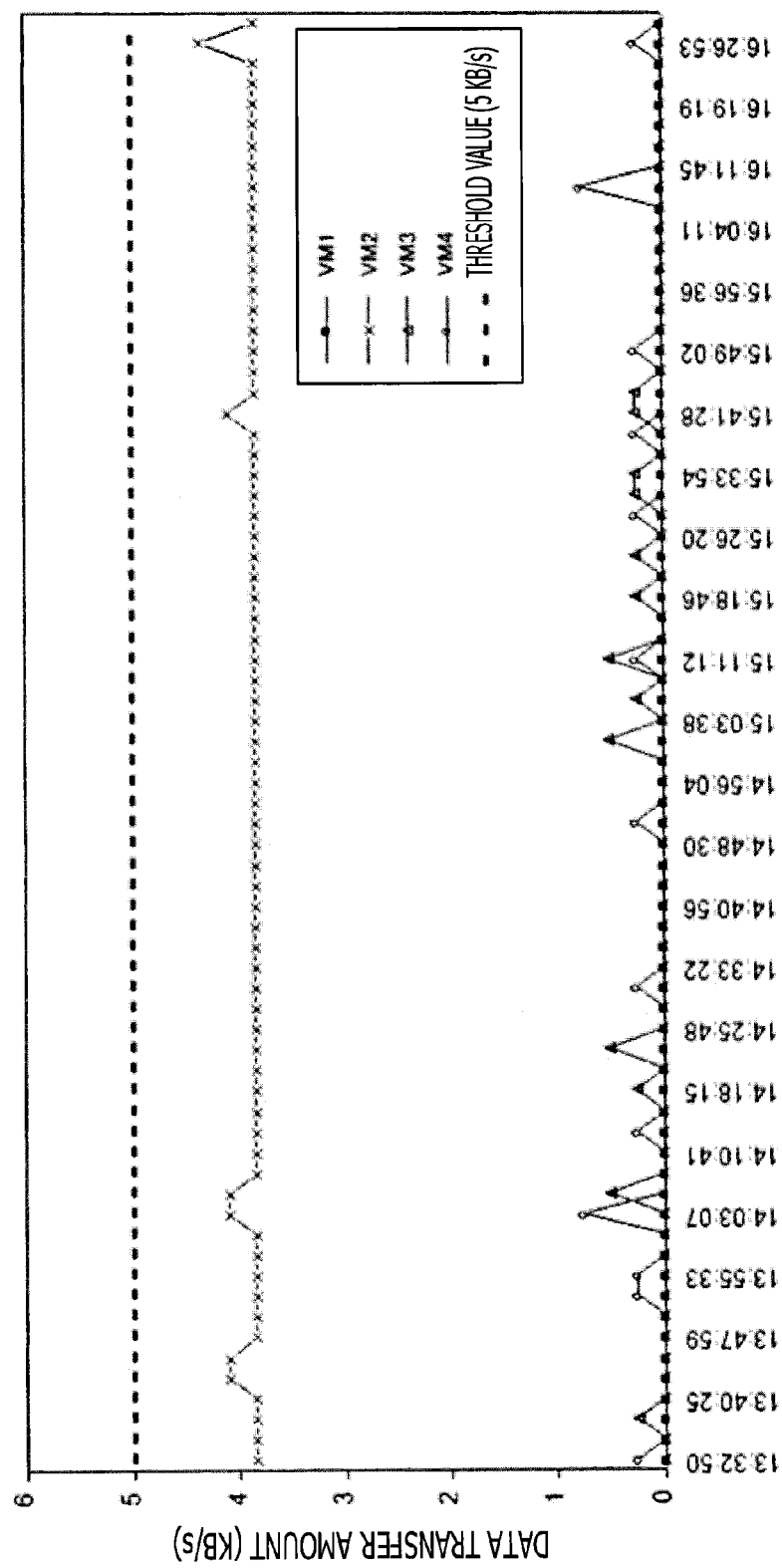
FIG. 12 illustrates comparison between a numerical value related to performance and a threshold value.

Comparison between a numerical value related to performance and a threshold value is described with reference to FIGS. 12 and 13. FIG. 12 illustrates an example of time-series change of the data transfer amount. In FIG. 12, a vertical axis represents a data transfer amount (KB/s) and a horizontal axis represents time. A dashed line represents a threshold value and the size of the threshold value is 5 KB/s. In the example of FIG. 12, the data transfer amounts of the VM1 to the VM4 are equal to or smaller than 5 KB/s during the period, so that it is determined that the VM1 to the VM4 are in the idle state when the CPU usage rate and the I/O data amount are also equal to or smaller than the threshold value.

Figure 13:
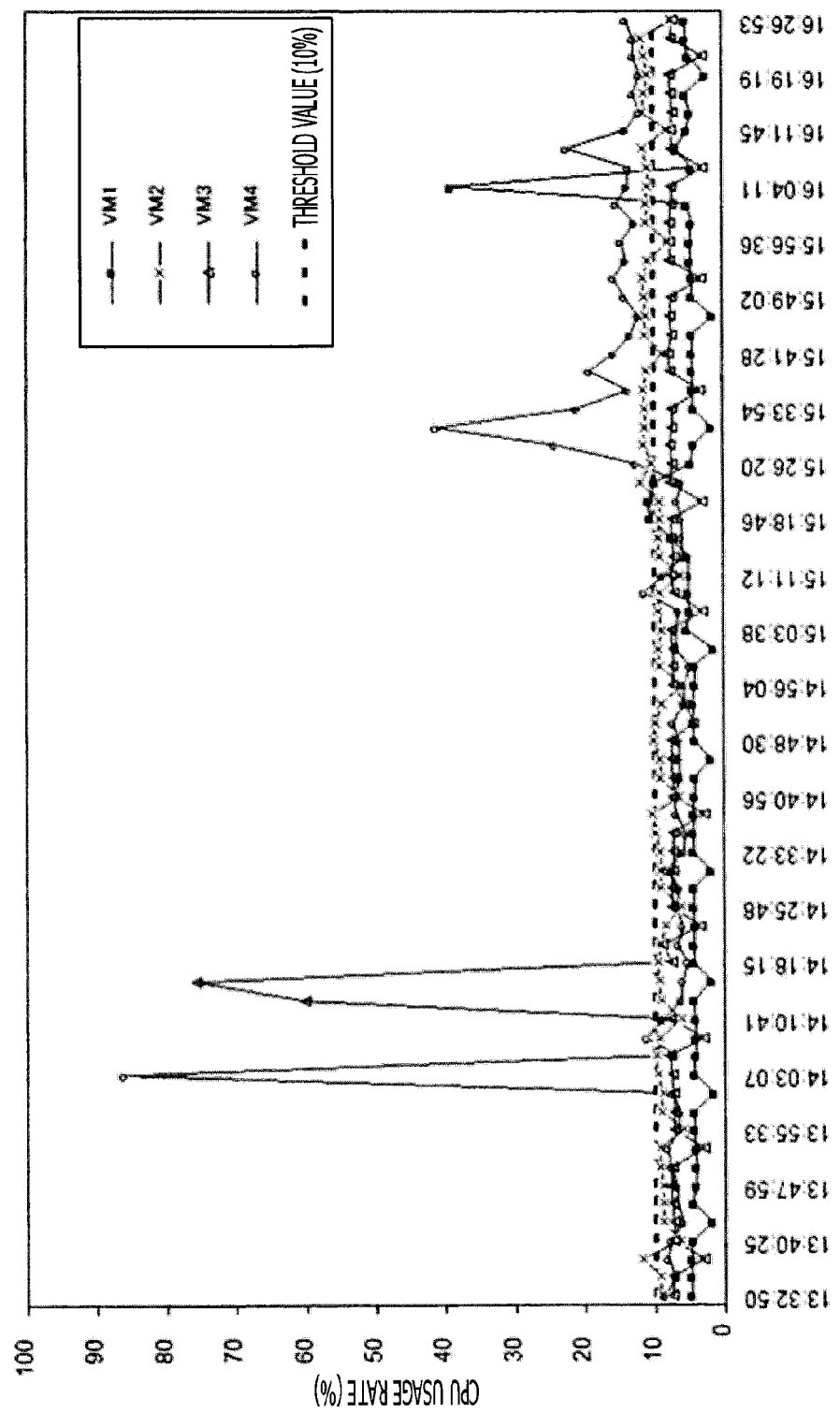
FIG. 13 illustrates comparison between a numerical value related to performance and a threshold value.

FIG. 13 illustrates an example of time-series change of the CPU usage rate. In FIG. 13, a vertical axis represents a CPU usage rate (%) and a horizontal axis represents time. A dashed line represents a threshold value and the size of the threshold value is 10%. In the example of FIG. 13, the CPU usage rates of the VM 1 and the VM3 are equal to or smaller than 10% during approximately the whole period, but the CPU usage rates of the VM2 and the VM4 often exceed 10% especially in the latter half. In such a case, it is determined that the VM2 and the VM4 are not in the idle state.

Here, it is determined that a VM is an idle VM when a percentage of idle time is equal to or larger than 90% for the latest and past periods so as to avoid such state that it is determined that a VM is not an idle VM due to an influence of a temporal processing (for example, virus scan).

Referring back to the description of FIG. 14, the setting unit 105 sets a stop priority order, a task priority order, and idle time in a VM table. Further, the setting unit 105 obtains a stop order of VMs on the basis of the stop priority order, the task priority order, and the idle time (step S21) so as to set the stop order in the VM table.

The stop priority order is set in accordance with a rule illustrated in FIG. 15, for example. That is, a rank order descends in the order of a pattern in which a VM is in the idle state in both of the past and latest periods, a pattern in which a VM is in the idle state only in the latest period, a pattern in which a VM is in the idle state only in the past period, and a pattern in which a VM is not in the idle state in either period. Remarks represent data representing a characteristic of a user in each pattern. Data of such a rule is stored in a data storage unit (not depicted) in the management server 1.

The task priority order is decided by using data stored in the control data storage unit 101.

In this embodiment, the setting unit 105 sorts the VM table in a descending order using the task priority order as a first key, the stop priority order as a second key, and the idle time as a third key. Then, the setting unit 105 assigns stop order ranks from the head row in sequence.

Referring back to the description of FIG. 14, the first specifying unit 107 determines whether or not current power is equal to or smaller than target power which is designated by the control data storage unit 101 (step S23). A sum of power consumption of respective physical servers which is acquired by a power sensor is used as current power, for example. When the current power is equal to or smaller than the target power (step S23: Yes route), no more VMs have to be stopped and therefore, the processing returns to the processing of step S7 of FIG. 7 via the terminal B. Then, at the next predetermined time, the processing of step S7 is executed. Accordingly, it is possible to regularly perform processing.

On the other hand, when the current power is larger than the target power (step S23: No route), the first specifying unit 107 searches for a combination of servers of which power use is smaller than the target power (step S25). In step S25, the first specifying unit 107 searches for a combination by using the maximum value of power consumption in the server table.

For example, in a case in which data depicted in FIG. 8 is stored in the server table and the target power is 556 W (that is, power consumption is reduced by 20%), the following six combinations are detected: (1) the host 1 and the host 2 (262 W+262 W+16 W=540 W<556 W), (2) the host 1 and the host 3 (262 W+16 W+262 W=540 W<556 W), (3) the host 2 and the host 3 (16 W+262 W+262 W=540 W<556 W), (4) the host 1 (262 W+16 W+16 W=294 W<556 W), (5) the host 2 (16 W+262 W+16 W=294 W<556 W), and (6) the host 3 (16 W+16 W+262 W=294 W<556 W).

For example, when the data depicted in FIG. 8 is stored in the server table and the target power is 348 W (that is, power consumption is reduced by 50%), the following three combinations are detected: (1) the host 1 (262 W+16 W+16 W=294 W<348 W), (2) the host 2 (16 W+262 W+16 W=294 W<348 W), and (3) the host 3 (16 W+16 W+262 W=294 W<348 W).

Here, in a case in which it is specified that power consumption is reduced by 80% or 100%, for example, there is no corresponding combination.

The first specifying unit 107 determines whether there is no combination of servers (step S27). When there is no combination of servers (step S27: Yes route), the first specifying unit 107 requests the generation unit 109 to execute processing. In response to the request, the generation unit 109 generates data of a procedure for turning off all servers or a procedure for cutting power supply to all servers (step S29) and stores the data in the procedure data storage unit 110. The processing shifts to step S43 of FIG. 16 via the terminal C. Thus, when there is no combination of servers, power supply to all servers is cut off, making it possible to ensure power consumption which is equal to or smaller than the target power.

Here, examples of a method for cutting power supply to servers include a method in which main switches of servers are turned off, a method in which a breaker of a power distribution board is turned off, a method in which a plug is pulled out, and the like. Here, regarding processing which is not executable automatically, data representing a procedure may be outputted to a display device and the like so as to allow a manager or the like to perform operations.

FIG. 17 illustrates an example of data of a procedure which is generated in step S29. In the example of FIG. 17, data representing processing for stopping the VM1, the VM2, and the VM4 to the VM9 and processing for turning off servers of the hosts 1 to 3 is included.

On the other hand, if there is at least one combination of servers (step S27: No route), the second specifying unit 108 searches for a combination of arrangement of VMs for every combination of servers (step S31).

A case in which power consumption is reduced by 20% is considered, for example. In the example of this embodiment, Idlestop=dynamic is designated, so that the VM3 and the VM10 have already been deleted. Accordingly, there are combinations below, for example.

(1) In the host 1, the VM1, the VM2, the VM4, and the VM8 are executed. The memory usage amount is 8

GB×4=32 GB and is equal to the physical memory amount which is 32 GB. In the host 2, the VM5, the VM6, the VM7, and the VM9 are executed. The memory usage amount is 8 GB×2+4 GB×2=24 GB and is smaller than the physical memory amount which is 32 GB. The number of times of migration of the VM is twice and the amount of data which is migrated is 8 GB(VM8)+4 GB(VM9)=12 GB.

(2) In the host 1, the VM1, the VM2, the VM4, and the VM9 are executed. The memory usage amount is 8 GB×3+4 GB=28 GB and is smaller than the physical memory amount which is 32 GB. In the host 2, the VM5, the VM6, the VM7, and the VM8 are executed. The memory usage amount is 8 GB×3+4 GB=28 GB and is smaller than the physical memory amount which is 32 GB. The number of times of migration of the VM is twice and the amount of data which is migrated is 8 GB(VM8)+4 GB(VM9)=12 GB.

(3) In the host 1, the VM1, the VM2, the VM4, and the VM5 are executed. The memory usage amount is 8 GB×4=32 GB and is equal to the physical memory amount which is 32 GB. In the host 2, the VM6, the VM7, the VM8, and the VM9 are executed. The memory usage amount is 8 GB×2+4 GB×2=24 GB and is smaller than the physical memory amount which is 32 GB. The number of times of migration of the VM is three times and the amount of data which is migrated is 8 GB(VM5)+8 GB(VM8)+4 GB(VM9)=20 GB.

Further, a case in which power consumption is reduced by 50% is considered. In this case, only one physical server may be used, so that all VMs may not be arranged due to limitation of the physical memory amount. For example, such combination that the VM1, the VM2, the VM6, and the VM7 are activated for a physical server to be operated is conceivable. In this case, VMs to be stopped are the VM4, the VM5, the VM8, and the VM9.

Referring back to the description of FIG. 14, the second specifying unit 108 determines whether there is no combination of arrangement of VMs (step S33). In step S33, if there is even one VM which has to be stopped, it is determined that there is no combination of arrangement of VMs. When there is at least one combination of arrangement of VMs (step S33: No route), the processing shifts to step S39 of FIG. 16 via the terminal D.

On the other hand, there is no combination of arrangement of VMs (step S33: Yes route), the second specifying unit 108 specifies a VM to be stopped, in accordance with a stop order which is set in the VM table (step S35). In step S35, one or a plurality of VMs to be stopped are specified, enabling arrangement of the rest of VMs in any physical servers.

The second specifying unit 108 specifies a combination of arrangement for VMs other than the VM specified in step S35 (step S37). Then, the processing shifts to step S39 of FIG. 16 via the terminal D.

Figure 16:
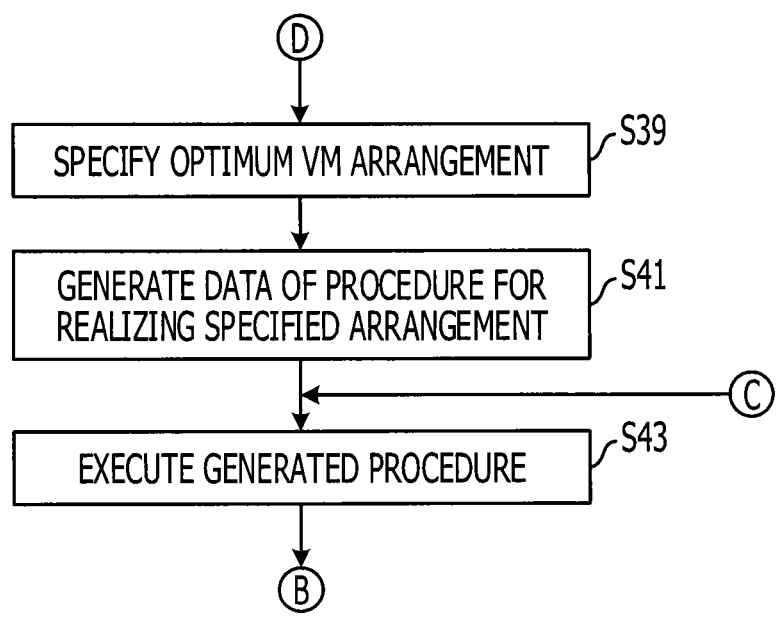
FIG. 16 illustrates a main processing flow.

Shifting to the description of FIG. 16, the second specifying unit 108 specifies the optimum arrangement of VMs among combinations specified in step S37 (step S39). Here, the optimum arrangement is arrangement in which the number of times of migration of VMs is the smallest and the amount of data to be migrated is the smallest. The second specifying unit 108 outputs data representing the specified arrangement to the generation unit 109.

The generation unit 109 generates data of a procedure for realizing the specified arrangement (step S41) and stores the data in the procedure data storage unit 110.

FIGS. 18 and 19 illustrate examples of data of a procedure which is generated in step S41. In the example of FIG. 18, data representing processing for stopping the VM10, processing for moving the VM8 and the VM9, and processing for turning off a server of the host 3 is included. Further, in the example of FIG. 19, data representing processing for stopping the VM4, the VM5, the VM8, and the VM9, processing for moving the VM6 and the VM7, and processing for turning off servers of the hosts 2 and 3 is included.

The execution unit 111 executes a procedure for making power consumption equal to or smaller than the target power in accordance with the data of a procedure which is read from the procedure data storage unit 110 (step S43).

Referring back to the description of FIG. 7, when it is determined that the condition of the end of the operation is satisfied in step S7 (step S7: Yes route), the preprocessing unit 102 issues, to the physical server, an activation guard cancellation request for requesting cancellation of the activation guard for a VM to which the activation guard is executed (step S45). In response to the request, the control unit 50 in the physical server which receives the activation guard cancellation request cancels the activation guard for a VM to which the activation guard is executed.

The preprocessing unit 102 executes processing for resuming a usual operation (for example, activation of a load distribution mechanism) (step S47). Further, the preprocessing unit 102 transmits notification representing the end of the operation to a terminal of a VM user (step S49). Then, the processing is ended.

Execution of the above-described processing enables generation of a threshold value based on performance data which is obtained from a VM which is actually in the idle state, making it possible to specify a VM which is in the idle state with high accuracy. Further, if a threshold value adjusted to an operation environment at given time is automatically set, a manager does not have to perform an operation for setting a threshold value, making it possible to reduce operation cost.

Further, a stop order is decided in accordance with the past and latest usage situations, so that it is fair among users. Thus, it is possible to perform a satisfactory operation for users.

Further, it is possible to control power consumption so as not to exceed designated target power, enabling peak-cut of power consumption.

Figure 20:
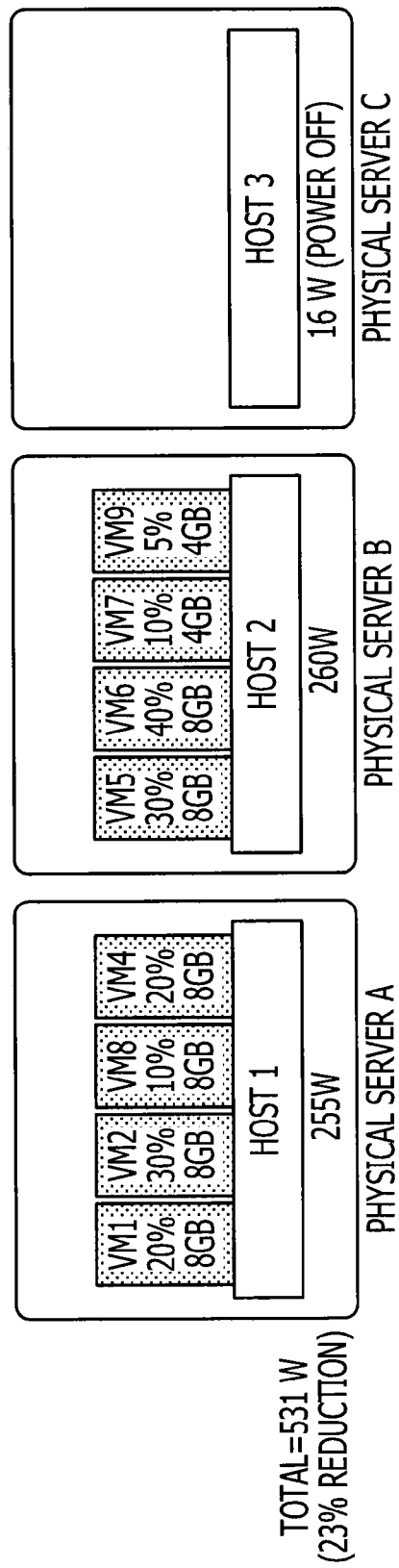
FIG. 20 illustrates an advantageous effect of the embodiment.

When the embodiment is applied to a system which is in the state depicted in FIG. 4 while setting target power to 556 W, a system which is in a state depicted in FIG. 20 is obtained, for example. In the example of FIG. 20, an idle VM3 which has been executed in the physical server A is stopped and an idle VM10 which has been executed in the physical server C is stopped. Further, the VM8 which has been executed in the physical server C is migrated to the physical server A and the VM9 which has been executed in the physical server C is migrated to the physical server B. Accordingly, there is no VM which is executed in the physical server C and the physical server C is turned off, so that power consumed by the physical server C is 16 W which is standby power. Accordingly, total power consumption is 255 W+260 W+16 W=531 W, thus being reduced by 23% compared to 695 W which is initial power consumption.

Figure 21:
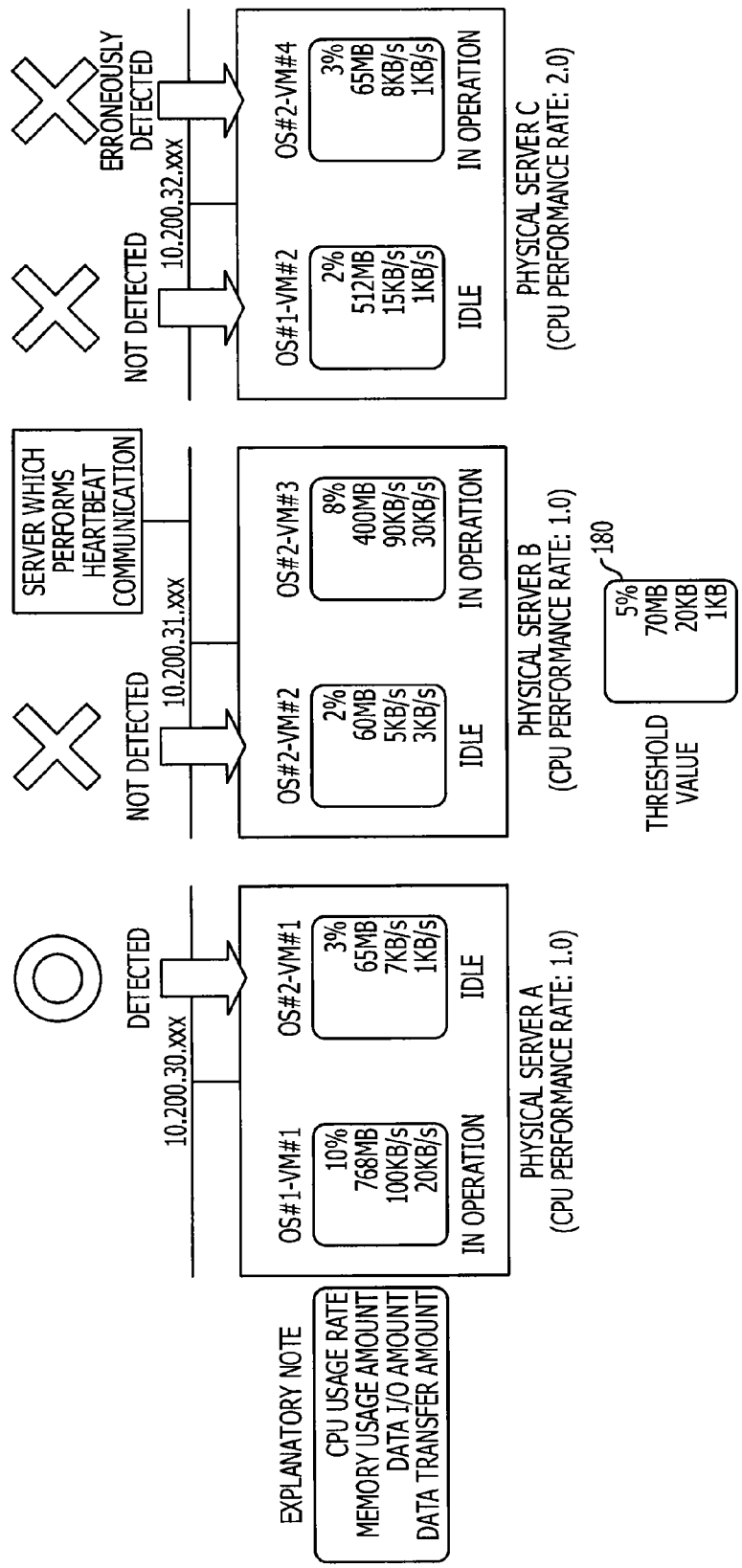
FIG. 21 illustrates detection of an idle VM in a case in which the embodiment is not applied.

Detection of an idle VM in a case in which the embodiment is not applied is described with reference to FIG. 21. In the example of FIG. 21, "OS#1-VM#1" and "OS#2-VM#1" are executed in the physical server A, "OS#2-VM#2" and "OS#2-VM#3" are executed in the physical server B, and "OS#1-VM#2" and "OS#2-VM#4" are executed in the physical server C. Here, "OS#2-VM#1" represents "a VM of which a type of an OS is 2 and an assigned number is 1", for example. The physical server A is connected to a network of which an address is "10.200.30.xxx", the physical server B is connected to a network of which an address is "10.200.31.xxx", and the physical server C is connected to a network of which an address is "10.200.32.xxx". A threshold value 180 is a threshold value which is uniformly set for the physical servers A to C. In the example of FIG. 21, when the threshold value 180 is compared with a numerical value related to performance of each VM and the numerical value is smaller than the threshold value for every item, it is determined that the VM is an idle VM.

In the example of FIG. 21, "OS#2-VM#1" in the physical server A is detected as an idle VM. However, even though "OS#2-VM#2" is an idle VM, "OS#2-VM#2" is not detected. This is because a server which performs heartbeat communication is connected to the network of which the address is "10.200.31.xxx" and therefore, the data transfer amount of "OS#2-VM#2" is higher than the data transfer amount of a normal idle VM. Further, "OS#1-VM#2" is not detected either, even though "OS#2-VM#2" is an idle VM. This is because a condition that a VM of which an OS is the OS#1 uses a memory of approximately 512 megabytes (MB) even in the idle state is not reflected to the threshold value 180. Further, "OS#2-VM#4" is detected as an idle VM even though "OS#2-VM#4" is in operation. This is because performance of a CPU of the physical server C is double compared to that of the physical server A and the physical server B, a CPU usage rate of the physical server C does not exceed the threshold value even if the physical server C performs the same operation as the physical server A and the physical server B, and accordingly, it is determined that "OS#2-VM#4" is in the idle state.

Thus, when the embodiment is not applied, it is difficult to detect a VM even though the VM is an idle VM and in addition, a VM in operation may be erroneously detected as an idle VM.

Figure 22:
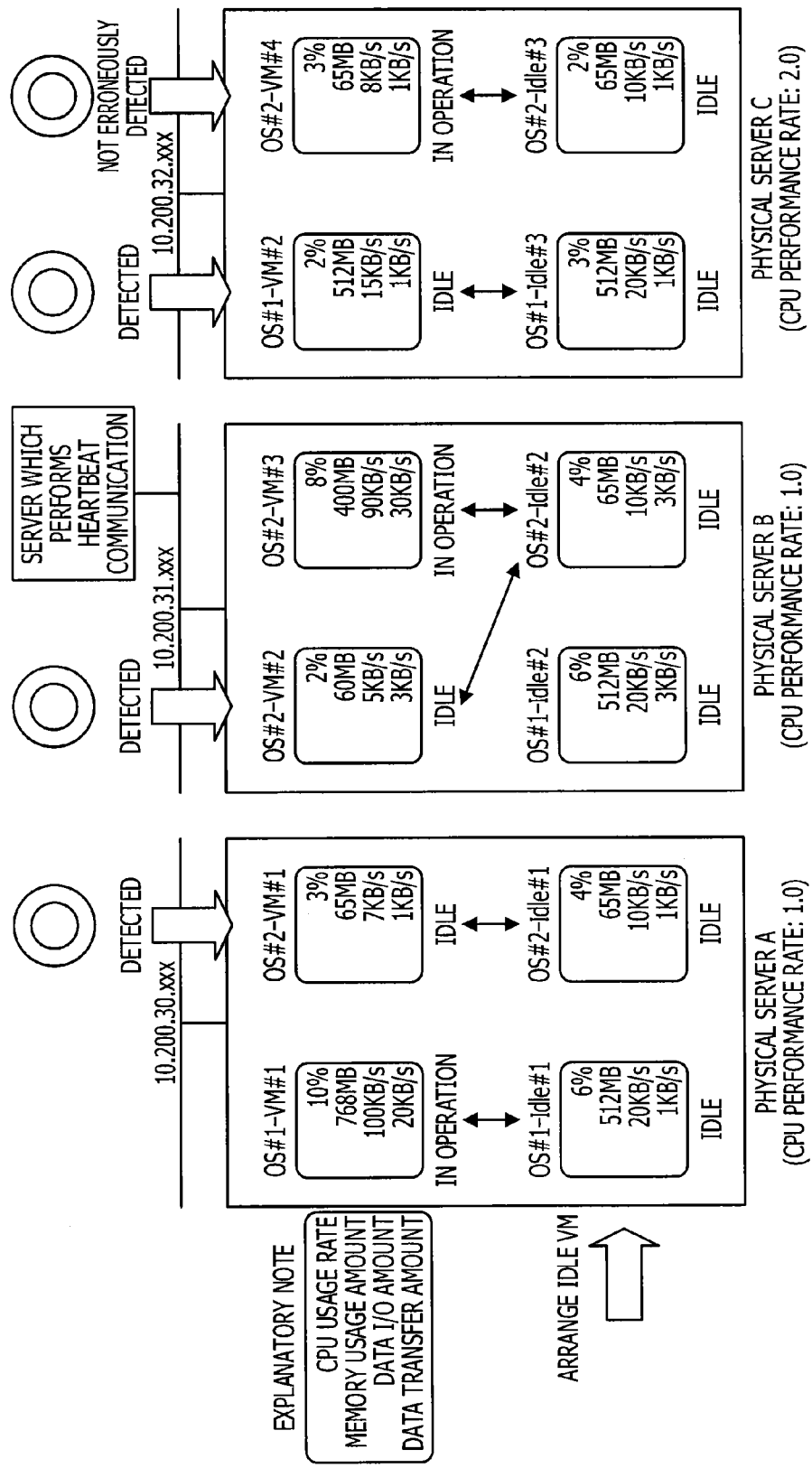
FIG. 22 illustrates detection of an idle VM in a case in which the embodiment is applied.

Detection of an idle VM in a case in which the embodiment is applied is described with reference to FIG. 22. The example of FIG. 22 is different in that an idle VM is purposely arranged for every type of OSs in each physical server. In the example of FIG. 22, "OS#1-Idle#1" and "OS#2-Idle#1" are executed in the physical server A, "OS#1-Idle#2" and "OS#2-Idle#2" are executed in the physical server B, and "OS#1-Idle#3" and "OS#2-Idle#3" are executed in the physical server C. Here, "OS#2-Idle#1" represents "an idle VM of which a type of an OS is 2 and an assigned number is 1", for example. In the example of FIG. 22, whether or not a VS is in the idle state is determined by using a threshold value which is calculated for every type of OSs in each physical server. Specifically, a numerical value related to performance of "OS#1-VM#1" is compared with a threshold value which is calculated by using a numerical value related to performance of "OS#1-Idle#1", a numerical value related to performance of "OS#2-VM#1" is compared with a threshold value which is calculated by using a numerical value related to performance of "OS#2-Idle#1", a numerical value related to performance of "OS#2-VM#2" is compared with a threshold value which is calculated by using a numerical value related to performance of "OS#2-Idle#2", a numerical value related to performance of "OS#2-VM#3" is compared with a threshold value which is calculated by using a numerical value related to performance of "OS#2-Idle#2", a numerical value related to performance of "OS#1-VM#2" is compared with a threshold value which is calculated by using a numerical value related to performance of "OS#1-Idle#3", and a numerical value related to performance of "OS#2-VM#4" is compared with a threshold value which is calculated by using a numerical value related to performance of "OS#2-Idle#3".

In the example of FIG. 22, not only "OS#2-VM#1" but also "OS#2-VM#2" and "OS#1-VM#2" are detected as idle VMs. This is because "OS#2-Idle#2" is arranged in the physical server B and therefore, a threshold value of the data transfer amount is set higher than the example of FIG. 21. Further, this is because a threshold value of the memory usage amount is calculated on the basis of the numerical value related to performance of "OS#1-Idle#3" and therefore, a threshold value of the memory usage amount is set higher than the example of FIG. 21.

Further, "OS#2-VM#4" in operation is erroneously detected in the example of FIG. 21, but "OS#2-VM#4" is not erroneously detected in the example of FIG. 22 and is determined as a VM in operation. This is because "OS#2-Idle#3" is arranged in the physical server C and therefore, a threshold value of the CPU usage rate is set lower than the example of FIG. 21.

Thus, application of the embodiment enables high-accuracy detection of an idle VM.

Further, application of the idea of the embodiment enables reduction of power which is consumed by a storage device. This is described with reference to FIGS. 23 and 24.

Figure 23:
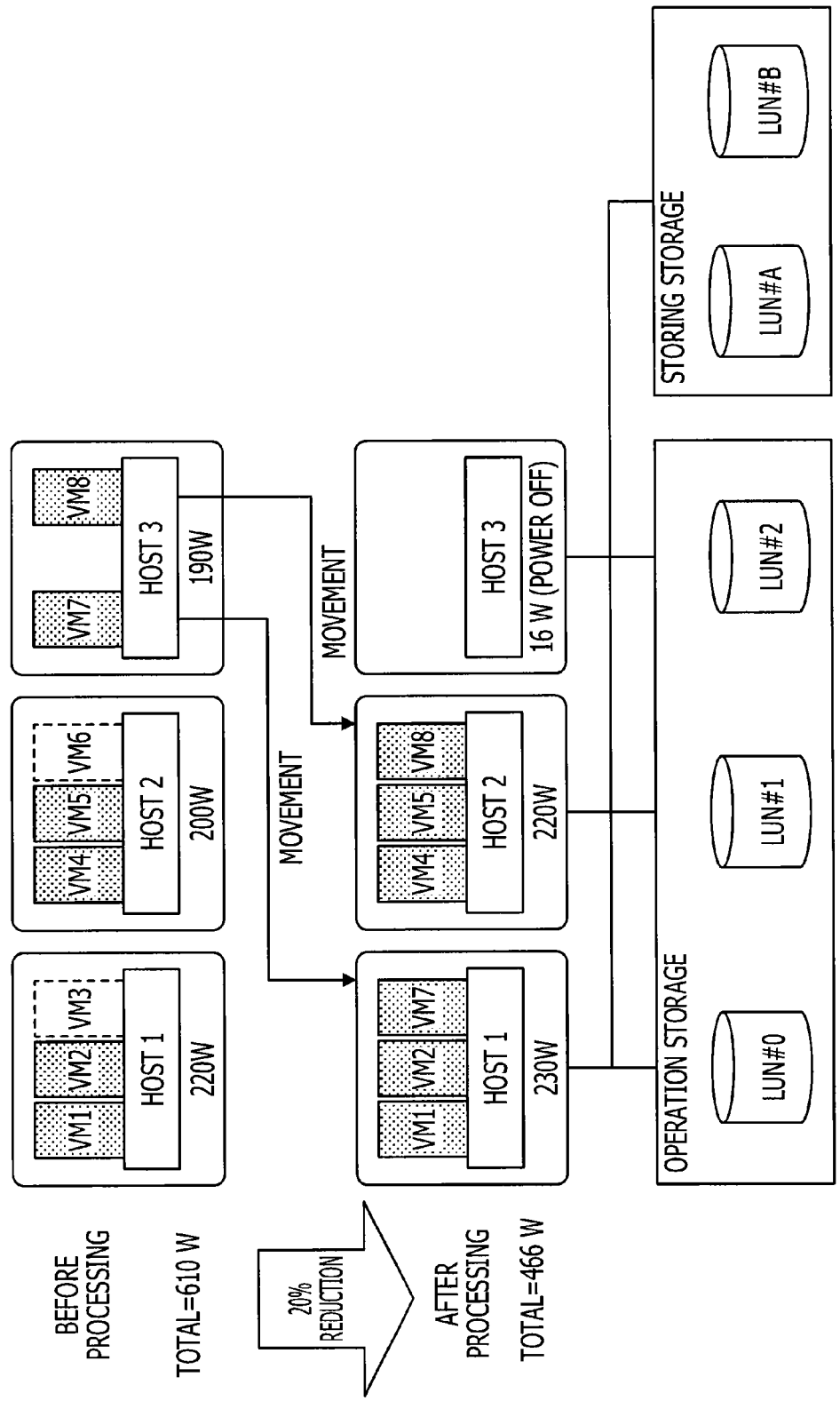
FIG. 23 illustrates a method for reducing power consumed by a storage device.

FIG. 23 illustrates the configuration of a system which includes physical servers and storage devices. The upper stage of FIG. 23 illustrates a state of the physical servers before execution of the processing of the embodiment, the intermediate stage illustrates a state of the physical servers after the execution of the processing of the embodiment, and the lower stage illustrates the storage devices which are connected to the physical servers. Operation storages among the storage devices include logical unit number (LUN)#0, LUN#1, and LUN#2 and storing storages among the storage devices include LUN#A and LUN#B. The storing storage is less expensive than the operation storage but exhibits lower speed. In the example of FIG. 23, the VM3 and the VM 6 which are idle VMs are stopped and the VM 7 and the VM8 are migrated so as to turn off the physical server of the host 3. Accordingly, power consumption in the entire physical servers is reduced by 20%. In FIG. 23, one LUN is assigned to one redundant arrays of inexpensive disks (RAID) group.

Figure 24:
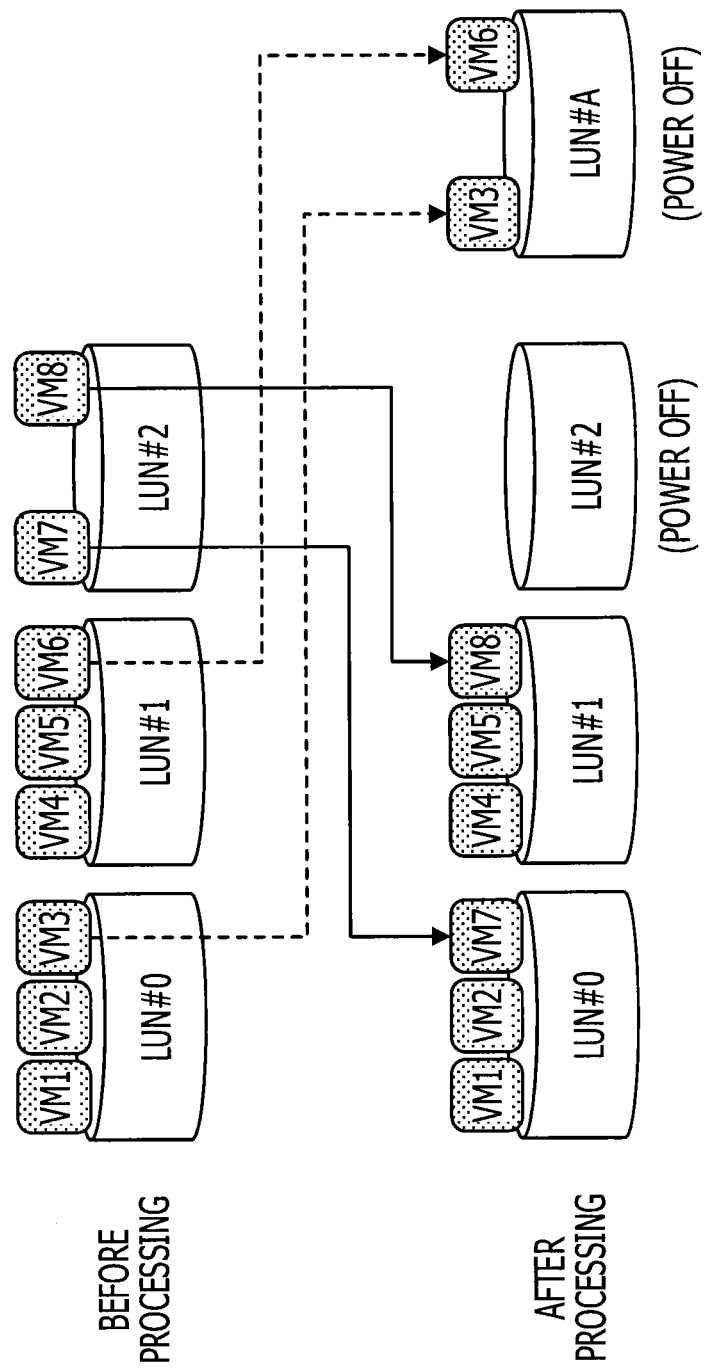
FIG. 24 illustrates a method for reducing power consumed by a storage device.

FIG. 24 illustrates files of VMs which are stored in the operation storage and the storing storage. The upper stage of FIG. 24 illustrates a state before processing and the lower stage of FIG. 24 illustrates a state after the processing. First, files of the VM3 and the VM6 which are stopped are migrated to LUN#A among the storing storages. This migration enables increase of free space of LUN"0 and LUN#1 which are the operation storages. Then, a file of the VM7 in LUN#2 is migrated to LUN#0 and a file of the VM8 in LUN#2 is migrated to LUN#1. Accordingly, there is no file of a VM in LUN#2, making it possible to automatically turn off LUN#2 by a massive array of idle disks (MAID) function. Further, LUN#A may be also turned off until the files of the VM3 and the VM6 are accessed. Here, the VM1 to the VM8 in FIG. 24 may be files constituting VM bodies or may be data regions which are accessed by VMs.

One embodiment of the present disclosure has been described thus far, but embodiments of the present disclosure are not limited to the above-described embodiment. For example, the functional block configurations of the management server 1 and the physical servers A to C described above may not be accorded with the actual program module configuration.

Further, the configuration of each table described above is one example and each table does not have to have the above-described configuration. Further, in the processing flow, orders of processing may be exchanged as long as the same processing result is obtained. Further, processing may be executed in parallel.

Here, target power ("PowerLimit= . . . ") may be designated by a cut rate (for example, "PowerCut= . . . "). In this case, peak power may be designated with a cut rate so as to clarify the period with peak power to which the cut rate corresponds.

Further, when calculation of a threshold value by the processing of step S13 is completed, an idle VM which is arranged by the processing of step S5 may be stopped. Accordingly, it is possible to avoid waste of power and resources by an idle VM.

Further, in FIG. 19 for example, a procedure for moving the VM4, the VM5, the VM8, and the VM9 to a physical server which is not turned off may be outputted after the stop of these VMs. Then, if there is demand for activation of a VM which has been stopped, it is possible to give a quick response (for example, activation).

Matters relating to the embodiment are described.

(1) Power Characteristic of Physical Server

Figure 25:
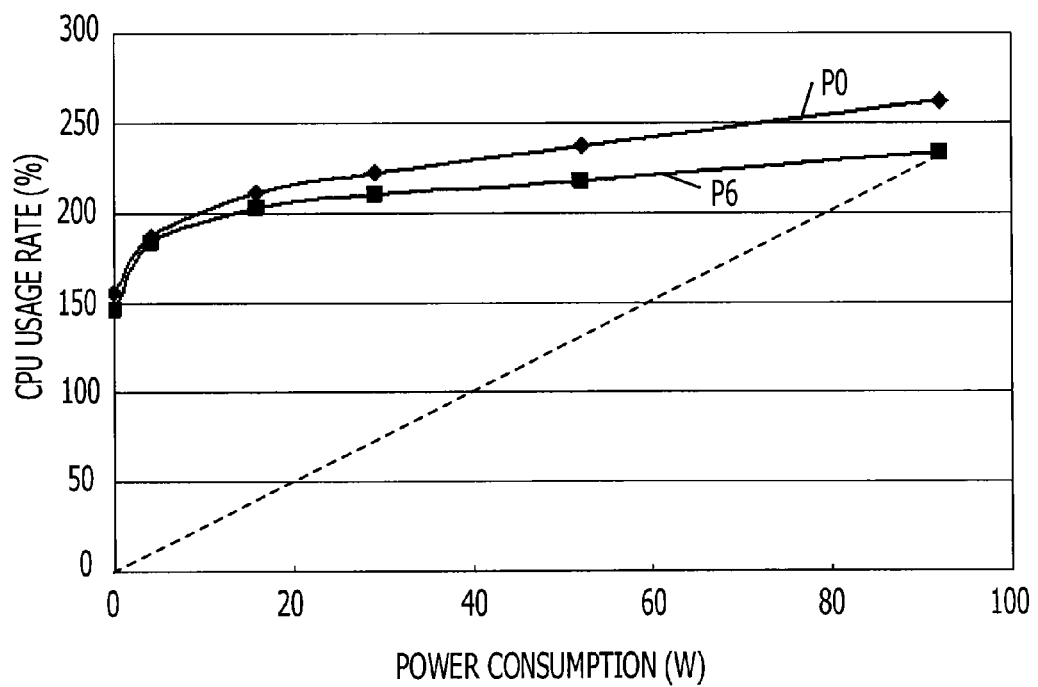
FIG. 25 illustrates a power characteristic of a physical server.

It is known that a physical server consumes considerable power even in the idle state. FIG. 25 illustrates an example of a relation between a CPU usage rate and power consumption. In FIG. 25, a horizontal axis represents a CPU usage rate (%) and a vertical axis represents power consumption (W). In FIG. 25, data of a case in which P-state of a CPU is "P0", data of a case in which P-state of a CPU is "P6", and a dashed line which passes through the origin are depicted. As illustrated in FIG. 25, a physical server consumes considerable power even in the idle state (that is, the CPU usage rate is around 0%) and a curve of power consumption is not a straight line which passes through the origin. For example, when a cloud system is built by using ten physical servers illustrated in the example of FIG. 25, the physical servers consume power of approximately 1500 W even if all of the ten physical servers are in the idle state.

Further, even if P-state of the CPU is changed, power consumption may not be largely reduced. In the example of FIG. 25, a reduction rate of power consumption is several percent when the CPU usage rate is 20% or less, and the reduction rate of power consumption is approximately 10% even when the CPU usage rate is 80% or more.

Here, power consumption in the maximum load, which is obtained on the basis of the graph depicted in FIG. 25, may be used as the maximum power consumption which is designated in the control statement.

(2) Amount of Memory Assigned to VM

Figure 26:
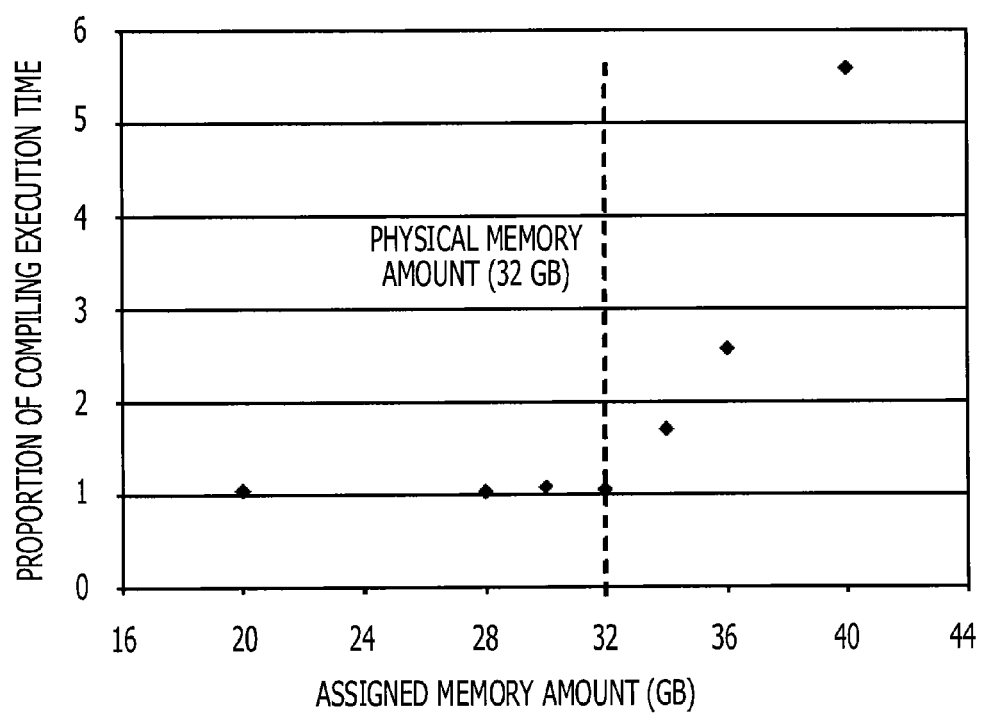
FIG. 26 illustrates a relation between an amount of a memory assigned to a VM and performance.

As the number of VMs which operate in a physical server is gradually increased, performance rapidly degrades at specific timing. This is described with reference to a graph of FIG. 26 which is generated on the basis of actual measurement data of a specific physical server. In FIG. 26, a horizontal axis represents an amount of a memory assigned to a VM and a vertical axis represents a proportion of compiling execution time. The proportion of compiling execution time is a proportion with respect to compiling execution time (536 seconds in this example) in an environment in which only VMs for measurement are arranged, and represents that performance degrades as a value thereof is increased. The amount of a physical memory provided to the physical server is 32 GB. As illustrated in FIG. 26, performance rarely varies when the amount of a memory assigned to the VM is 32 GB or less. However, when the amount of a memory assigned to the VM exceeds 32 GB, the proportion of compiling execution time rapidly increases. This is because memory over-commitment has occurred.

(3) CPU Usage Rate in Datacenter

Figure 27:
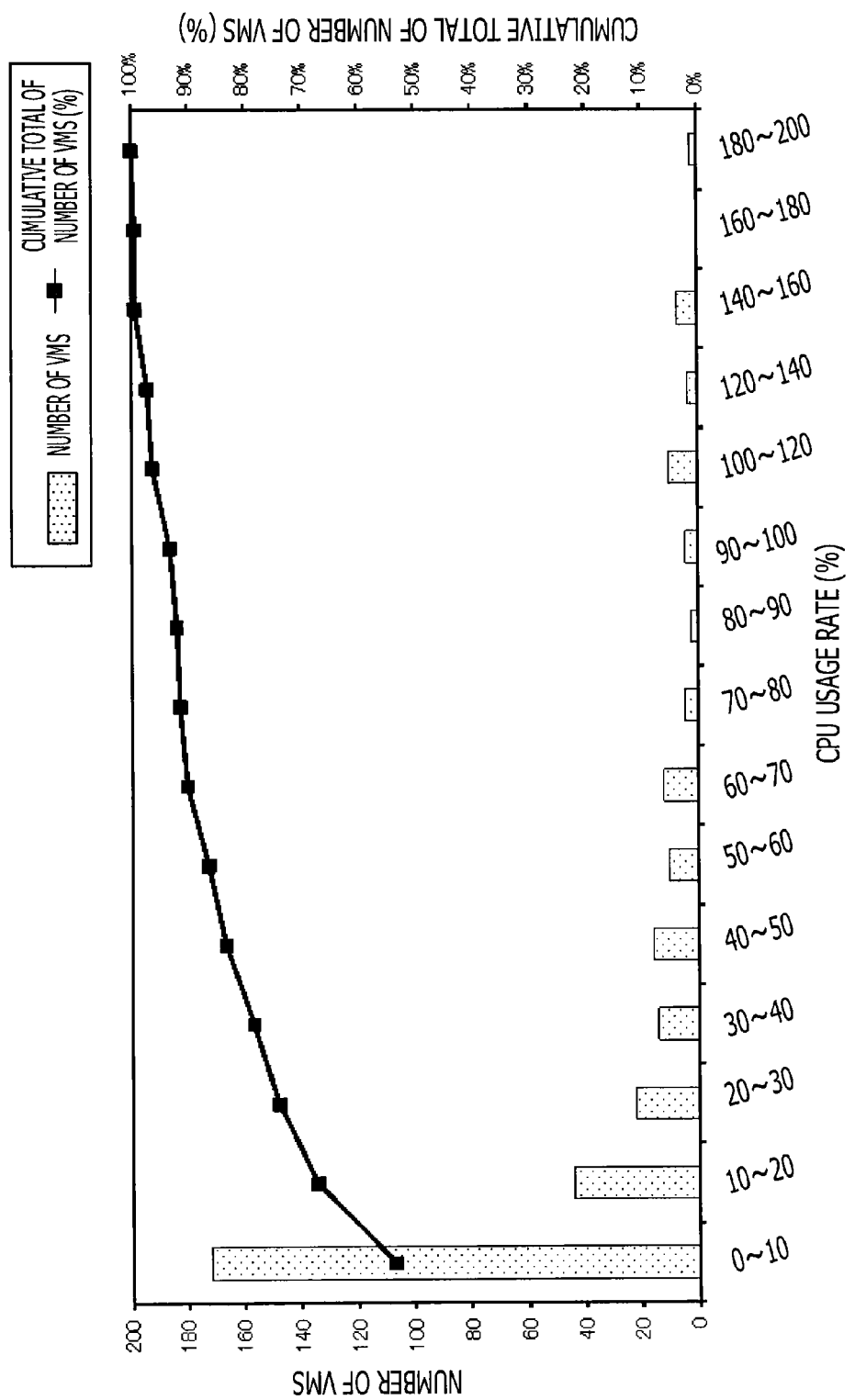
FIG. 27 illustrates a CPU usage rate in a datacenter.

It is pointed out that there are many idle VMs and the VMs are not efficiently used in the datacenter. This is described with reference to a graph of FIG. 27 which is generated on the basis of actual measurement data in a specific datacenter. In FIG. 27, a horizontal axis represents a CPU usage rate (%) of a VM, a left vertical axis represents the number of VMs, and a right vertical axis represents a cumulative total of the number of VMs (%). As illustrated in FIG. 27, VMs of which the CPU usage rate is 10% or less account for about half of the total number of VMs in this datacenter and VMs of which the CPU usage rate is 50% or less account for approximately 80%. If idle VMs are detected among VMs exhibiting a low CPU usage rate and the idle VMs are stopped, it is possible to largely reduce power consumption of the datacenter. Further, resources used by idle VMs may be utilized for other uses, making it possible to efficiently use the resources.

(4) Data Transfer Amount in Network

Figure 28:
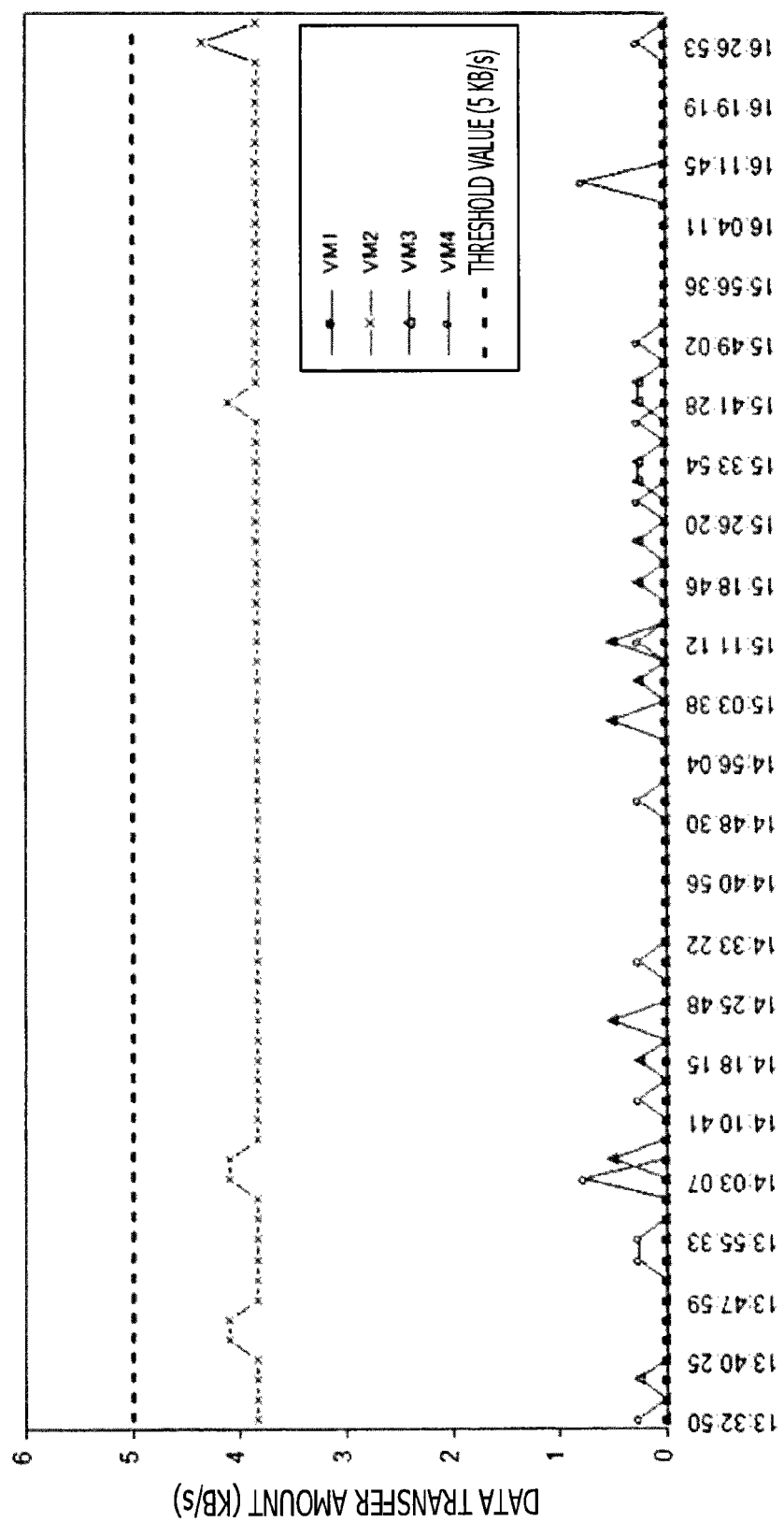
FIG. 28 illustrates time-series change of a data transfer amount in a network.

FIG. 28 illustrates data transfer amounts of the VM1 to the VM4 of which an OS is OS#1. Network addresses of the VM1 to the VM4 are different from each other, but other conditions are the same as each other. The VM1 to the VM4 are idle VMs. As illustrated in FIG. 28, the data transfer amounts of VMs other than the VM2 are approximately 1 KB/s, but the data transfer amount of only the VM2 is approximately 4 KB/s.

Figure 29:
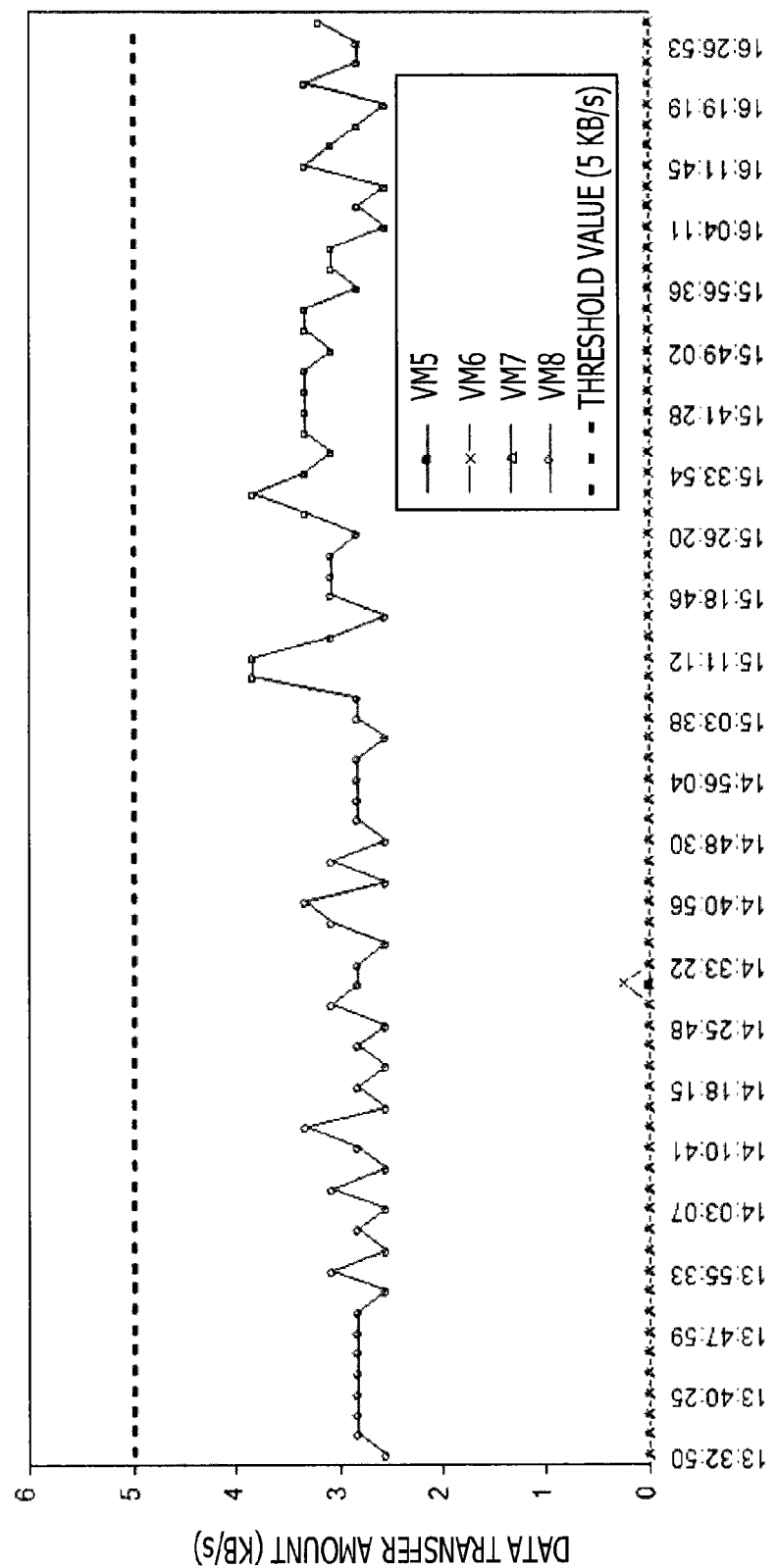
FIG. 29 illustrates time-series change of a data transfer amount in a network.

FIG. 29 illustrates data transfer amounts of the VM5 to the VM8 of which an OS is OS#1. Network addresses of the VM5 to the VM8 are different from each other, but other conditions are the same as each other. The VM5 to the VM8 are idle VMs. As illustrated in FIG. 29, the data transfer amounts of VMs other than the VM8 are approximately 0 KB/s, but the data transfer amount of only the VM8 is approximately 3 KB/s.

Thus, one of causes of difference in a data transfer amount in a case in which VMs are arranged in different networks is heartbeat communication. The heartbeat communication is performed for notifying other computers of a normal operation of a computer. VMs which are arranged in a network in which a computer which performs the heartbeat communication exists receive a broadcast packet of the heartbeat communication, so that it is considered that the data transfer amount in the network in which the VMs are arranged is increased. Accordingly, it is difficult to detect idle VMs unless a threshold value of the data transfer amount is appropriately set by using the method of the embodiment.

Figure 30:
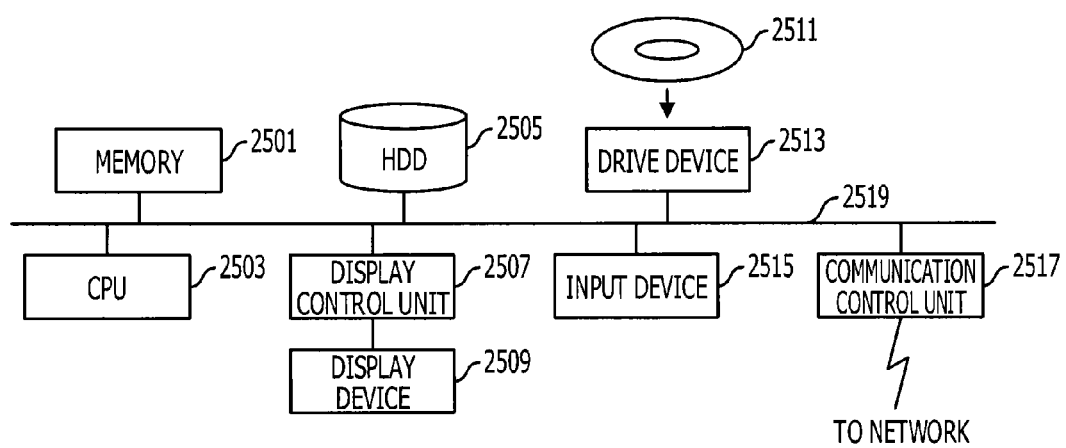
FIG. 30 is a functional block diagram of a computer.

Here, the management server 1 described above is a computer device, in which a memory 2501, a central processing unit (CPU) 2503, a hard disk drive (HDD) 2505, a display control unit 2507 which is connected with a display device 2509, a drive device 2513 for a removable disk 2511, an input device 2515, and a communication control unit 2517 for connection to a network are mutually connected by a bus 2519, as depicted in FIG. 30. An operating system (OS) and an application program for executing the processing of the embodiment are stored in the HDD 2505 and are read from the HDD 2505 to the memory 2501 when being executed by the CPU 2503. The CPU 2503 controls the display control unit 2507, the communication control unit 2517, and the drive device 2513 in accordance with a processing content of the application program so as to allow the display control unit 2507, the communication control unit 2517, and the drive device 2513 to perform predetermined operations. Further, data in processing is mainly stored in the memory 2501, but may be stored in the HDD 2505. In the embodiment of the present disclosure, the application program for executing the above-described processing is stored in the removable disk 2511, which is readable by a computer, and is distributed so as to be installed on the HDD 2505 through the drive device 2513. The application program may be installed on the HDD 2505 via a network such as the Internet and the communication control unit 2517. Such a computer device realizes the above-described various functions when hardware such as the CPU 2503, the memory 2501, and the like described above, the OS, and a program such as the application program organically cooperate with each other.

The above-described embodiment of the present disclosure is summarized as the following.

A management method according to the embodiment is executed by a management device which manages a virtual machine which operates in an information processing device. Further, the management method includes processing for (A) transmitting an arrangement request for requesting arrangement of a first virtual machine, which does not execute processing, in an information processing device, to the information processing device, (B) acquiring information related to an operation of the first virtual machine and information related to operations of virtual machines, which operate in the information processing device, other than the first virtual machine from the information processing device, and (C) specifying a virtual machine which does not execute processing among the virtual machines other than the first virtual machine, by using the obtained information related to the operation of the first virtual machine and the obtained information related to the operations of the virtual machines other than the first virtual machine.

Accordingly, information related to an operation of a virtual machine which is actually in the idle state is available, making it possible to specify a virtual machine which is in the idle state with high accuracy.

Further, there may be a plurality of above-described information devices. The above-mentioned processing for transmitting an arrangement request to the information processing device includes (a1) processing for transmitting an arrangement request to any information processing device among a plurality of information processing devices having the same attributions in a case in which there are a plurality of information processing devices having the same attributions among a plurality of information processing devices. It is considered that pieces of information which are related to an operation of a virtual machine and are acquired from a plurality of information processing devices having the same attributions (for example, a model of the information processing device, an OS installed on the information processing device, a connection environment, and the like) are approximately the same as each other. Resources of the information processing device are not wasted according to the above-described processing.

Further, in the above-mentioned processing for specifying a virtual machine which does not execute processing, a virtual machine which does not execute the processing may be specified by (c1) calculating a threshold value for determining whether or not a virtual machine is in the idle state on the basis of the information related to the operation of the first virtual machine, and (c2) determining whether or not a numerical value included in the information related to the operations of the virtual machines other than the first virtual machine exceeds the calculated threshold value. Accordingly, it becomes possible to set an appropriate threshold value compared to a case in which a user uniformly sets threshold values.

Further, a plurality of types of operating systems may be executed by a virtual machine which operates in the above-described information processing device. Further, in the above-mentioned processing for transmitting an arrangement request to the information processing device, (a2) an arrangement request for requesting arrangement of the first machine may be transmitted to the information processing device for each of the plurality of operating systems. Even virtual machines which operate in the same information processing device may have different operation characteristics when operating systems are different from each other. Appropriate response is enabled even in a case in which there are a plurality of types of operating systems, according to the above-described processing.

Further, the management method may further include processing for (D) transmitting a stop request for requesting stop of a virtual machine which does not execute specified processing to the information processing device. Accordingly, it becomes possible to avoid waste of power by a virtual machine which is in the idle state.

Further, the management method may further include processing for (E) determining whether or not power consumed by the information processing device is equal to or larger than predetermined target power, (F) specifying a virtual machine to be stopped, by using time in which a virtual machine, which operates in the information processing device, used to be in the idle state in a past predetermined period when it is determined that power consumed by the information processing device is equal to or larger than the predetermined target power, and (G) transmitting a stop request for requesting stop of the specified virtual machine to the information processing device. Accordingly, it becomes possible to perform control so that the information processing device does not consume power equal to or larger than the predetermined target power. Further, the past idle state may be taken into account, making it possible to suppress stop of a virtual machine which is not to be stopped.

Further, in the above-mentioned processing for transmitting a stop request to the information processing device, (d1) a virtual machine to be stopped may be specified by further using priority of processing performed by a virtual machine which operates in the information processing device. Accordingly, it becomes possible to suppress interruption of execution of processing which is to be preferentially executed.

Here, a program which makes a computer perform processing according to the above-mentioned method may be created, and the program is stored in a recording medium or a storage device which is readable by the computer, such as a flexible disk, a CD-ROM, a magnetooptical disk, a semiconductor memory, and hard disk. Here, an intermediate processing result is temporarily held in a storage device such as a main memory.

According to the above-described embodiment, it is possible to specify a virtual machine which is in the idle state.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A system comprising:
   circuitry configured to
     acquire first information indicating an amount of a hardware resource of a server used by a first virtual machine executed in an idle state on the server;
     determine, from the acquired first information, a threshold value corresponding to the amount of the hardware resource used by a virtual machine executed in the idle state on the server;
     acquire second information indicating an amount of the hardware resource used by a second virtual machine executed on the server; and
     determine whether the second virtual machine is in the idle state based on comparison between the acquired second information and the threshold value, wherein
   a plurality of virtual machines are executed on the server,
   the plurality of virtual machines operate a plurality of types of operating systems, and
   the circuitry is configured to
     cause the server to execute the first virtual machine in the idle state for each of the types of the operating systems;
     acquire the first information with regard to the first virtual machine for each of the types of the operating systems; and
     determine the threshold value corresponding to each of the types of the operating systems based on the acquired first information corresponding to each of the types of the operating systems.

2. The system of claim 1, wherein
   the system includes a plurality of servers, and
   the circuitry is configured to
     cause any one of server among the plurality of servers to execute the first virtual machine in the idle state,
     acquire the first information with regard to the first virtual machine executed in the idle state on the any one of the plurality of servers, and
     determine the threshold value from the acquired first information.

3. The system claim 1, wherein
   the circuitry is configured to stop execution of the second virtual machine when it is determined that the second virtual machine is in the idle state based on the comparison.

4. The system of claim 3, wherein
   the system includes a plurality of servers, and
   the second virtual machine and a fourth virtual machine are executed in a first server of the plurality of servers,
   the circuitry is configured to migrate the fourth virtual machine to a second server of the plurality of servers after the execution of the second virtual machine is stopped.

5. The system of claim 1, wherein
   the system includes a plurality of servers, and
   the second virtual machine is executed in a first server of the plurality of servers,
   the circuitry is configured to migrate the second virtual machine to a second server of the plurality of servers when it is determined that the second virtual machine is in the idle state and to stop the first server.

6. The system of claim 1, wherein
   the first virtual machine is executed and the comparison is performed when a consumed power of the system exceeds a threshold.

7. The system of claim 6, wherein
   the system includes a plurality of servers, and
   the consumed power is a total con sinned power of the plurality of servers.

8. The system of claim 1, wherein
   the circuitry is configured to determine whether to stop execution of the second virtual machine when second virtual machine is determined to be in the idle state based on a type of hardware resource used by the second virtual machine.

9. The system of claim 1, wherein
   the circuitry is configured to determine whether to stop execution of the second virtual machine when the second virtual machine is determined to be in the idle state based on a priority of processing performed by the second virtual machine.

10. The system of claim 1, wherein the circuitry is configured to:
    compare the first information with third information indicating an amount of hardware resource used by a third virtual machine executed on the server; and
    determine whether the third virtual machine is in the idle state based on the comparison.

11. The system of claim 10, wherein
    the circuitry is configured to stop execution of at least one of the second and third virtual machines based on a type of hardware resource used by the second and third virtual machines.

12. The system of claim 10, wherein
    the circuitry is configured to stop execution of at least one of the second and third virtual machines based on a priority of processing performed by the second and third virtual machines.

13. The system of claim 10, wherein
    the circuitry is configured to generate a list including the second and third virtual machines ordered based on a type of hardware resource used by the second and third virtual machines and a priority of processing performed by the second and third virtual machines.

14. The system of claim 13, wherein
    the circuitry is configured to select to stop execution of at least one of the second and third virtual machines based on the list.

15. The system of claim 1, wherein
    the circuitry is configured to compare the first information with the second information in each of a first period and a second period, and stop execution of the second virtual machine when it is determined that the second virtual machine is in the idle state in both of the first period and the second period.

16. The system of claim 1, wherein
    the first type of hardware resource is any one of a usage rate of a processor included in the server, a usage rate of a memory included in the server, and a data transfer amount of the system.

17. A method comprising:
    acquiring first information indicating an amount of a hardware resource of a server used by a first virtual machine executed in an idle state on the server;
    determine, from the acquired first information, a threshold value corresponding to the amount of the hardware resource used by a virtual machine executed in the idle state on the server;

acquiring second information indicating an amount of the hardware resource used by a second virtual machine executed on the server; and determining, via circuitry, whether the second virtual machine is in the idle state based on a comparison between the acquired second information and the threshold value, wherein a plurality of virtual machines are executed on the server, the plurality of virtual machines operate a plurality of types of operating systems, and the method further comprises causing the server to execute the first virtual machine in the idle state for each of the types of the operating systems;

acquiring the first information with regard to the first virtual machine for each of the types of the operating systems; and determining the threshold value corresponding to each of the types of the operating systems based on the acquired first information corresponding to each of the types of the operating systems.

18. A non-transitory computer-readable medium including computer program instructions, which when executed by an information processing system, cause the system to:

acquire first information indicating an amount of a hardware resource of a server used by a first virtual machine executed in an idle state on the server;

determine, from the acquired first information, a threshold value corresponding to the amount of the hardware resource used by a virtual machine executed in the idle state on the server;

acquire second information indicating an amount of the hardware resource used by a second virtual machine executed on the server;

determine whether the second virtual machine is in the idle state based on comparison between the acquired second information and the threshold value, wherein a plurality of virtual machines are executed on the server and the plurality of virtual machines operate a plurality of types of operating systems;

cause the server to execute the first virtual machine in the idle state for each of the types of the operating systems;

acquire the first information with regard to the first virtual machine for each of the types of the operating systems; and determine the threshold value corresponding to each of the types of the operating systems based on the acquired first information corresponding to each of the types of the operating systems.

19. The system of claim 1, wherein the circuitry is configured to control the server to execute the first virtual machine in the idle state to acquire the first information used to determine the threshold value.

* * * * *